(12) United States Patent
Togami

(10) Patent No.: US 8,717,648 B2
(45) Date of Patent: May 6, 2014

(54) IMAGE PROCESSING APPARATUS, IMAGE PROCESSING METHOD, AND COMPUTER PROGRAM PRODUCT

(75) Inventor: Atsushi Togami, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 617 days.

(21) Appl. No.: 12/926,783

(22) Filed: Dec. 9, 2010

(65) Prior Publication Data

US 2011/0141500 A1 Jun. 16, 2011

(30) Foreign Application Priority Data

Dec. 16, 2009 (JP) ................................. 2009-285651
Nov. 2, 2010 (JP) ................................. 2010-246728

(51) Int. Cl.
G03F 3/08 (2006.01)
H04N 1/60 (2006.01)
G06K 9/00 (2006.01)

(52) U.S. Cl.
USPC ............................ 358/518; 358/1.9; 382/167

(58) Field of Classification Search
USPC .......... 358/1.9, 515, 518, 520, 521, 523, 524, 358/540; 382/162, 164, 165, 167
See application file for complete search history.

(56) References Cited

U.S. PATENT DOCUMENTS

| | | | | |
|---|---|---|---|---|
| 5,073,818 | A * | 12/1991 | Iida | 358/523 |
| 5,592,310 | A * | 1/1997 | Sugiura | 358/501 |
| 5,966,222 | A * | 10/1999 | Hirata et al. | 358/520 |
| 6,035,059 | A * | 3/2000 | Kurosawa et al. | 382/164 |
| 6,118,895 | A * | 9/2000 | Hirota et al. | 382/165 |
| 6,178,008 | B1 * | 1/2001 | Bockman et al. | 358/1.9 |
| 6,503,004 | B2 | 1/2003 | Togami | |
| 7,376,268 | B2 | 5/2008 | Shirata et al. | |
| 7,388,688 | B2 * | 6/2008 | Yamazaki et al. | 358/1.9 |
| 7,483,082 | B2 * | 1/2009 | Chou | 348/645 |
| 7,551,796 | B2 | 6/2009 | Ohyama et al. | |
| 7,664,320 | B2 | 2/2010 | Yoshida et al. | |
| 7,692,816 | B2 | 4/2010 | Kawamoto et al. | |
| 7,724,986 | B2 | 5/2010 | Murataka et al. | |
| 8,326,032 | B2 * | 12/2012 | Yamaguchi et al. | 382/166 |
| 2001/0051065 | A1 | 12/2001 | Togami | |
| 2003/0030647 | A1 | 2/2003 | Togami | |
| 2004/0071339 | A1 * | 4/2004 | Loce et al. | 382/162 |

(Continued)

FOREIGN PATENT DOCUMENTS

| | | |
|---|---|---|
| JP | 3560640 B2 | 11/1995 |
| JP | 2004-058450 A | 2/2004 |
| JP | 2008-067296 A | 3/2008 |

OTHER PUBLICATIONS

English language abstract for JP-07-303189 which corresponds to JP-3560640-B2.

*Primary Examiner* — Madelein A Nguyen
(74) *Attorney, Agent, or Firm* — Harness, Dickey & Pierce, P.L.C.

(57) ABSTRACT

An image processing apparatus includes: a setting unit that sets a color index representing a category to which an achromatic color and at least one chromatic color that are included in image data belong; an adjustment unit that adjusts a color tone of the achromatic color belonging to the category that is indicated by the set color index in accordance with a hue of the chromatic color belonging to the category; and a generation unit that generates image data including the chromatic color belonging to the category and the achromatic color of which the color tone is adjusted by the adjustment unit.

7 Claims, 19 Drawing Sheets

(56) References Cited

U.S. PATENT DOCUMENTS

| | | |
|---|---|---|
| 2004/0114172 A1 | 6/2004 | Ohyama et al. |
| 2004/0125410 A1 | 7/2004 | Shirata et al. |
| 2004/0131263 A1 | 7/2004 | Kawamoto et al. |
| 2004/0156076 A1 | 8/2004 | Togami et al. |
| 2004/0239969 A1* | 12/2004 | Shoda et al. .................. 358/1.9 |
| 2005/0052667 A1* | 3/2005 | Yamazaki et al. ............. 358/1.9 |
| 2005/0078122 A1* | 4/2005 | Ohga ............................ 345/589 |
| 2005/0213120 A1 | 9/2005 | Ohkawa et al. |
| 2005/0213128 A1* | 9/2005 | Imai et al. ..................... 358/1.9 |
| 2005/0243375 A1 | 11/2005 | Ohyama et al. |
| 2005/0280857 A1 | 12/2005 | Sugiyama et al. |
| 2006/0061809 A1 | 3/2006 | Murataka et al. |
| 2006/0089133 A1 | 4/2006 | Yoshizawa et al. |
| 2006/0181707 A1* | 8/2006 | Gibson et al. ................. 356/402 |
| 2006/0215205 A1 | 9/2006 | Ohyama et al. |
| 2007/0030504 A1 | 2/2007 | Kawamoto et al. |
| 2007/0053009 A1 | 3/2007 | Ito et al. |
| 2007/0058224 A1 | 3/2007 | Kawamoto et al. |
| 2007/0064267 A1 | 3/2007 | Murakata et al. |
| 2007/0070405 A1 | 3/2007 | Murakata et al. |
| 2007/0070438 A1 | 3/2007 | Yoshida et al. |
| 2007/0086068 A1 | 4/2007 | Ohkawa et al. |
| 2007/0226692 A1 | 9/2007 | Nozawa et al. |
| 2007/0285685 A1* | 12/2007 | Hirayama ...................... 358/1.9 |
| 2008/0008388 A1 | 1/2008 | Ohkawa et al. |
| 2008/0037036 A1 | 2/2008 | Togami et al. |
| 2008/0043291 A1 | 2/2008 | Togami et al. |
| 2008/0068671 A1 | 3/2008 | Yoshida et al. |
| 2008/0231903 A1* | 9/2008 | Misawa et al. ................. 358/2.1 |
| 2008/0309994 A1* | 12/2008 | Komatsu ........................ 358/505 |
| 2009/0040564 A1* | 2/2009 | Granger ......................... 358/2.1 |
| 2009/0147313 A1 | 6/2009 | Miyagi et al. |
| 2009/0213396 A1 | 8/2009 | Togami |
| 2009/0231645 A1* | 9/2009 | Hayashi ......................... 358/520 |
| 2010/0053695 A1 | 3/2010 | Togami |

* cited by examiner

GENERAL CASE

CONTRAST ↑
UNIFORMITY ↓

CONTRAST ↓
UNIFORMITY ↑

CASE WHERE THERE IS LIMITATION ON
REPRODUCTION OF CHROMATIC COLOR

ENHANCEMENT OF COLOR CONTRAST

CASE WHERE THERE IS NO LIMITATION ON
REPRODUCTION OF CHROMATIC COLOR
(GENERAL CASE)

$$\begin{pmatrix} a_{cr} & a_{cg} & a_{cb} & a_c \\ a_{mr} & a_{mg} & a_{mb} & a_m \\ a_{yr} & a_{yg} & a_{yb} & a_y \\ a_{kr} & a_{kg} & a_{kb} & a_k \end{pmatrix} = \begin{pmatrix} C1 & C2 & C3 & C4 \\ M1 & M2 & M3 & M4 \\ Y1 & Y2 & Y3 & Y4 \\ K1 & K2 & K3 & K4 \end{pmatrix} \times \begin{pmatrix} R1 & R2 & R3 & R4 \\ G1 & G2 & G3 & G4 \\ B1 & B2 & B3 & B4 \\ 1 & 1 & 1 & 1 \end{pmatrix}^{-1}$$

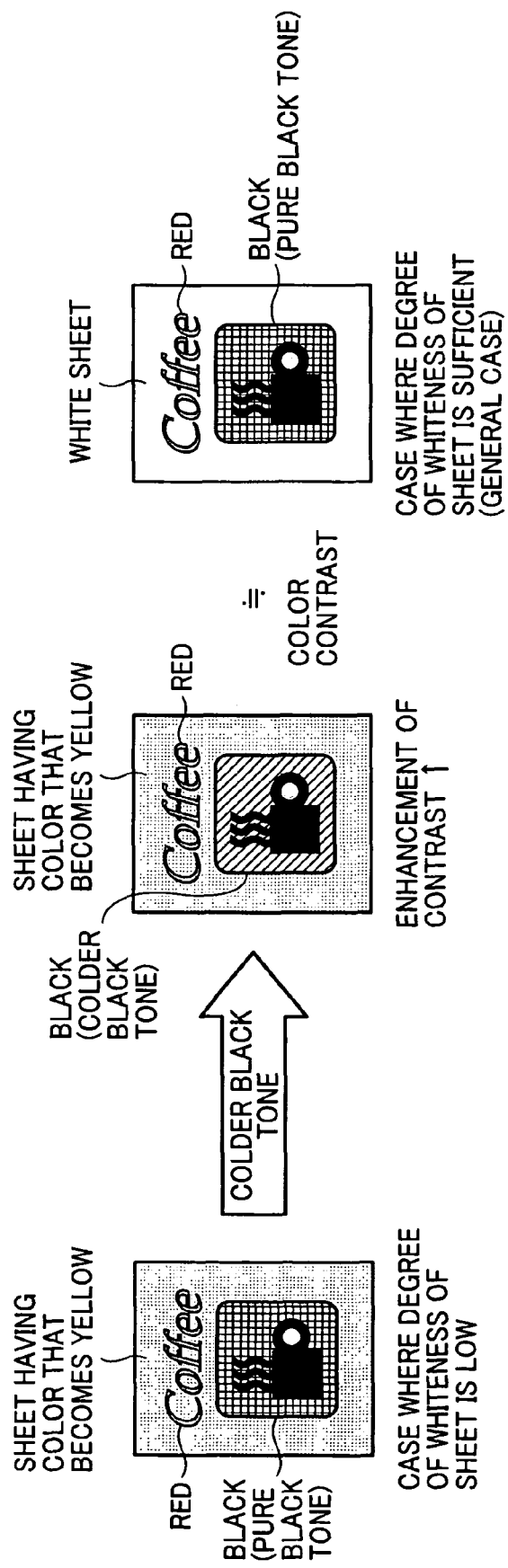

CASE WHERE DEGREE OF
WHITENESS OF SHEET IS LOW

ENHANCEMENT OF COLOR CONTRAST

CASE WHERE DEGREE OF WHITENESS
OF SHEET IS SUFFICIENT (GENERAL CASE)

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2009-285651 filed in Japan on Dec. 16, 2009 and Japanese Patent Application No. 2010-246728 filed in Japan on Nov. 2, 2010.

BACKGROUND OF THE INVENTION

1. Field of the Invention

The present invention relates to an image processing apparatus, an image processing method, and a computer program product.

2. Description of the Related Art

Generally, in MFPs (Multi Function Peripherals) and printers, the printing cost of full-color output is higher than that of monochrome output. Accordingly, under some circumstances in which reduction of the printing cost is important, the use of the MFPs or printers may be supervised to be restricted to monochrome output by a supervisor of a system including the MFPs, the printers, and the like in many cases.

Even when the use of the MFP or the printer is restricted to the monochrome output, there may be circumstances in which a color output that uses a color (or colors) locally is desired for a document for in-house distribution of a company (for example, a document for in-house distribution with an annotation that is desired to be in red). In Japanese Patent No. 3560640, for the purpose of increasing the representational power of an output material that is output by an MFP, a printer, or the like, while suppressing the increase in printing cost, it is disclosed that two-color printing technology termed two-color copy or two-color printing is used. According to the two-color printing technology, a chromatic color is disposed in the middle of an achromatic color in a pin-point manner. It is highly effective in enabling the point that must be focused to be visually distinguished. Such an output may have merits over a simple full-color output depending on the design.

However, in the general two-color printing technology using an achromatic color and a chromatic color, it is only considered that the output material is represented by using two colors including an achromatic color and one chromatic color, but the relation between the two colors representing the output material such as color contrast (color difference) of the two colors is not considered. More specifically, in connection with the general two-color printing technology, in the case of using black and red for the two-color printing, what kind of attribute of the black fits the red most is not considered; but the output material is just represented with black that is just the color of a black coloring material used for generating an image. However, actually, due to the influence of a printing process, an image generating process, or the like, the color tone (a combination of brightness and saturation) of black that is output is deviated from an ideal state. Thus, depending on the manner in which the color tone of black is deviated and on the combination of black and a chromatic color, the color contrast between the chromatic color and the achromatic color might decrease; which results in a problem in that the representational power of the output material through two-color printing becomes weak. FIG. 22 is a diagram illustrating an example of a difference in color between the achromatic color and the chromatic color in the case in which an ideal black coloring material is used; and an example of a difference in chromaticity between the achromatic color and the chromatic color in the case in which a black coloring material that has been used practically is used. In the examples shown in FIG. 22, since the color tone of the black coloring material, which is practically used, is deviated from the ideal state (a state in which the saturation of the coloring material of the achromatic color is "zero") in the same direction as the chromatic color due to saturation, the color contrast between the chromatic color and the achromatic color decreases.

SUMMARY OF THE INVENTION

It is an object of the present invention to at least partially solve the problems in the conventional technology.

According to an aspect of the present invention, there is provided an image processing apparatus including: a setting unit that sets a color index representing a category to which an achromatic color and at least one chromatic color that are included in image data belong; an adjustment unit that adjusts a color tone of the achromatic color belonging to the category that is indicated by the set color index in accordance with a hue of the chromatic color belonging to the category; and a generation unit that generates image data including the chromatic color belonging to the category and the achromatic color of which the color tone is adjusted by the adjustment unit.

According to another aspect of the present invention, there is provided an image processing method that is performed in an image processing apparatus that includes a control unit, the image processing method comprising in the control unit: setting a color index representing a category to which an achromatic color and at least one chromatic color that are included in image data belong by using a setting unit; adjusting a color tone of the achromatic color belonging to the category that is set at the setting in accordance with a hue of the chromatic color belonging to the category by using an adjustment unit; and generating image data including the chromatic color belonging to the category and the achromatic color of which the color tone is adjusted by the adjustment unit by using a generation unit.

According to still another aspect of the present invention, there is provided a computer program product comprising a non-transitory computer-usable medium having computer-readable program codes embodied in the medium for an image processing method that is performed in an image processing apparatus that includes a control unit, the program codes when executed causing a computer to execute the above mentioned method.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is a schematic diagram illustrating an example of enhancement in color contrast depending on the degree of whiteness of a sheet;

DETAILED DESCRIPTION OF THE PREFERRED EMBODIMENTS

Hereinafter, an MFP (Multi Function Peripheral) according to an embodiment of the present invention, to which an image processing apparatus, an image processing method, and a computer program product of the present invention are applied, will be described in detail with reference to the accompanying drawings.

First Embodiment

Figure 1:
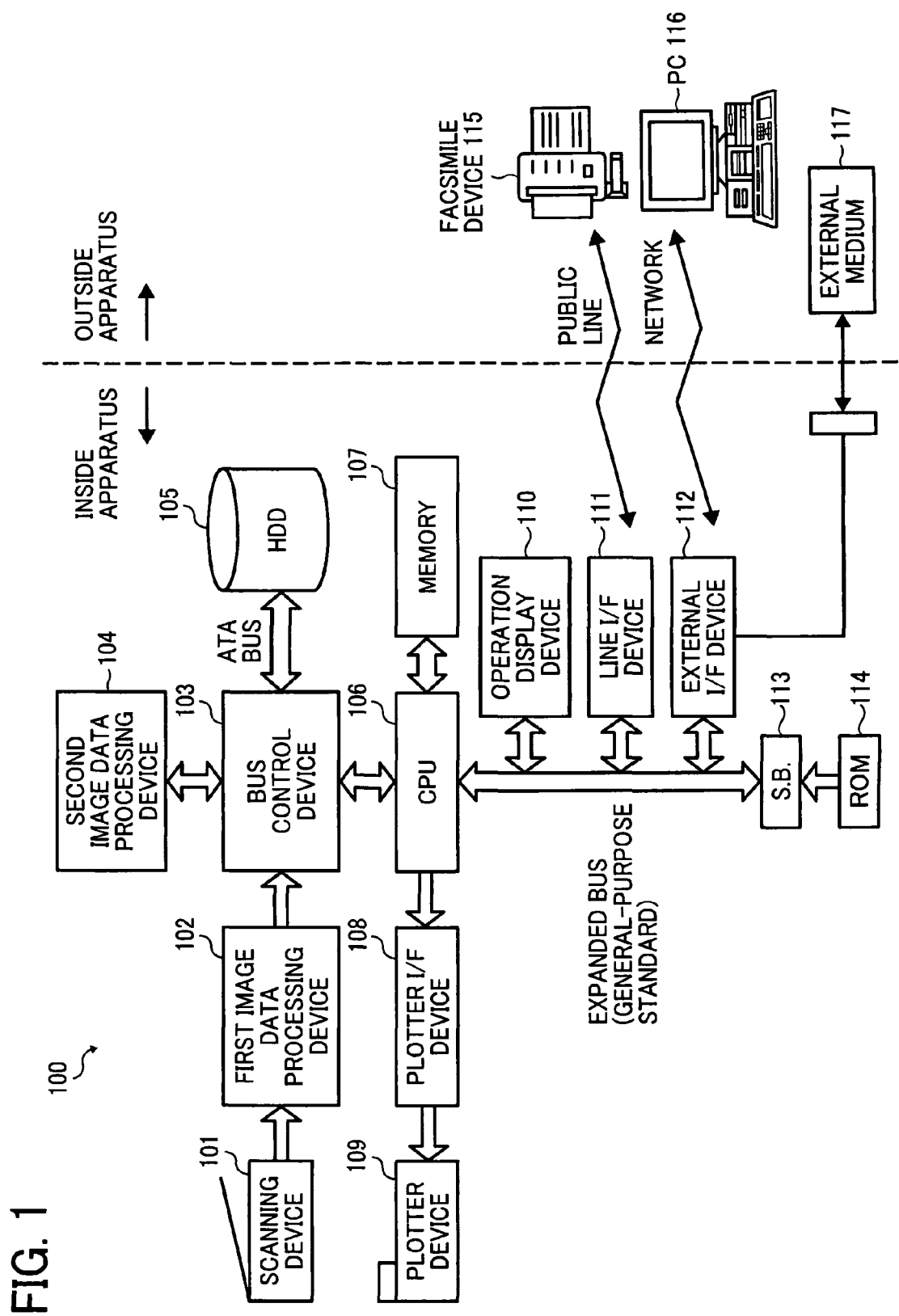
FIG. 1 is a block diagram showing the overall structure of an MFP according to a first embodiment.

FIG. 1 is a block diagram showing the overall structure of an MFP according to a first embodiment. A scanning device 101 includes a line sensor that is configured by a photoelectric conversion element (for example, Charge Coupled Device (CCD)), an A/D converter, and driving circuits thereof. The scanning device 101 generates digital image data of RGB each having 0.8 bits based on shading information of a document that is acquired by scanning the document that is set and outputs the generated digital image data. In this embodiment, although the scanning device 101 includes the CCD, the same structure may be employed even in the case where an image sensor such as a Contact Image Sensor (CIS) or a CMOS is included. In addition, in accordance with a recent trend of an increase in the number of scanned bits, digital image data of RGB each having 10 bits or 12 bits may be generated.

A first image data processing device 102 performs image processing of the digital image data output from the scanning device 101 so as to uniformize the characteristics of the data to predetermined characteristics. Since the input image data scanned by the scanner depends on the device characteristics of the scanner, a signal component that depends on the device is suppressed or excluded, a process of normalizing the image data is performed, and the digital image data converted into universal data that can be used for various outputs through this process, and then the processed image data is stored in an HDD 105 to be described later. In other words, the digital image data is processed into data having characteristics that are appropriate for requirements of an output destination in which a stored image is reused. In addition, the image processing of the first image data processing device 102 will be described later in detail.

A bus control device 103 is a data bus via which various types of data such as digital image data or a control command necessary for the MFP 100 is exchanged, and also has a bridge function between plural types of bus standards. In this embodiment, the bus control device 103 is formed as an Application Specific Integrated Circuit (ASIC) that is connected to the first image data processing device 102 and a second image data processing device 104, and a CPU 106 through PCI-Express, and is connected to the HDD 105 through an ATA bus.

The second image data processing device 104 performs adjustment, editing, or processing of an image or image processing that is appropriate for an output destination designated by a user for the digital image data of which characteristics are uniformized into predetermined characteristics by the first image data processing device 102 and digital image data (input image data) which is input through a line I/F device 111 or an external I/F device 112. For example, the second image data processing device 104 converts the digital image data, of which characteristics are uniformized into the predetermined characteristics by the first image data processing device 102, into digital image data (output image data) of CMYK depending on a device (a printer or the like) of the output destination in the case in which the digital image data is output to (printed on) a paper sheet. The image processing of the second image data processing device 104 will be described later in detail.

The Hard Disk Drive (HDD) 105 is a memory device with large capacity used for storing electronic data (for example, digital image data or the like) in a desk top PC or the like, and mainly stores digital image data and auxiliary information of the digital image data in the MFP 100. In this embodiment, the HDD 105 is connected to the bus control device 103 through an ATA bus that is standardized by expanding Integrated Drive Electronics (IDE).

In this embodiment, although the HDD 105 is used as the memory device of high capacity, another device such as a silicon disk using a flash memory, of which the capacity has been recently increased, may be used as the memory device of high capacity. In the case in which the silicon disk is used as the memory device of high capacity, a decrease in power consumption and an improvement in access speed of the memory device of high capacity can be expected.

The Central Processing Unit (CPU) 106 is a microprocessor that performs overall control of the MFP 100. In this embodiment, as the CPU 106, an integrated CPU such as an RM11100 made by PMC Corporation is used. The integrated CPU has been recently used widely; and it has a structure in which some functions are added to a single-core CPU, for example a function of performing connection with a universal standard I/F or a function of connecting a bus using a crossbar switch.

A memory 107 is a volatile memory that temporarily stores data to be exchanged so as to absorb an offset in speed at the time of bridging between a plurality of types of bus standards, and an offset in processing speed between components connected to each other; and that temporarily stores a program and intermediate process data when the CPU 106 controls the MFP 100. Since high-speed processing is required for the CPU 106, the MFP 100 is started up by a boot program that is stored in a ROM 114 at the time of an ordinary start-up operation; and thereafter the CPU 106 performs a process in accordance with a program that has expanded in the memory 107 that can be accessed at high speed. In this embodiment, as the memory 107, a Dual Line Memory Module (DIMM) that is used in a standardized personal computer is used.

When receiving the digital image data of CMYK transmitted through the universal standard I/F that is integrated to the CPU 106, a plotter I/F device 108 performs a bus bridge process in which the received digital image data is output to an I/F that is dedicated to a plotter device 109. In this embodiment, as the universal standard I/F, a PCI-Express bus is used.

When receiving the digital image data of CMYK, the plotter device 109 outputs the received digital image data to a transfer sheet through an electrophotographic process using laser beams. Although the plotter device 109 may be configured so as to receive only digital image data of K and to output the received digital image data of K to a transfer sheet in the case in which monochrome output is performed; here, for convenience of the description, the plotter device 109 is assumed to receive digital image data of CMYK all the time.

In this embodiment, although the plotter device 109 outputs the digital image data to a transfer sheet using the electrophotographic process; processes to be used for producing the output of the digital image data can be arbitrarily selected. Thus, for example, the digital image data may be output to a transfer sheet by an inkjet engine that is frequently used for a personal use. In the case in which the digital image data is transferred to a transfer sheet through ink jetting, an inkjet engine corresponding to color inks of six colors or seven colors can be used for the plotter device 109. In addition, also for an electrophotographic process, an image forming engine using a multi-color plate that uses a special color toner or a transparent toner is proposed, which may be used for the plotter device 109 in a similar manner.

An S.B. 113 is one of chipsets that are used in a personal computer and is a general-purpose electronic device termed as south bridge. The S.B. 113 is a universal circuit of a bridge mechanism of a bus that is frequently used when a CPU system mainly including a PCI-Express and an ISA bridge is built. In this embodiment, the S.B. 113 bridges between the ROM 114 and the other components.

The Read Only Memory (ROM) 114 is a memory, in which programs (including the boot program) used when the CPU 106 controls the MFP 100, is stored. The ROM 114 is a non-volatile memory in which a stored program is not erased even when the power of the MFP 100 is turned off.

An operation display device 110 is a unit for interfacing between the MFP 100 and a user, and is configured by a liquid crystal display device (LCD) and with key switches. The operation display device 110 displays various statuses and operation methods of devices, and detects the input of a key switch from the user. In this embodiment, the operation display device 110 is connected to the CPU 106 through the PCI-Express bus.

The line I/F device 111 is a device that connects the PCI-Express bus and a public line such as a telephone line. The MFP 100 can exchange various types of data through the communication line by using the line I/F device 111.

A facsimile device 115 is an ordinary facsimile, and transmits or receives image data to or from the MFP 100.

The external I/F device 112 is a device that connects the PCI-Express bus and an external device (a PC 116, an external medium 117, or the like). The MFP 100 can exchange various types of data with external devices by using the external I/F device 112. In this embodiment, as a connection I/F between the external I/F device 112 and an external device, a network (for example, Ethernet (registered trademark)) and a Universal Serial Bus (USB) are used. In other words, the MFP 100 is connected to external media such as a network and an SD card through the external I/F device 112. As the network, any of a wired LAN (Local Area Network), a wireless LAN, and the like may be used.

A PC 116 is a so-called personal computer. A user can perform various control operations or input or output of image data to the MFP 100 through an application or a driver that is installed in the personal computer.

The external medium 117 is a storage device such as a so-called CompactFlash (registered trademark) card or an SD card. The external medium 117 allows recording of various types of electronic data including image data thereon, and the user performs input or output of the image data for the MFP 100.

Here, described will be with reference to FIGS. 1 to 5 how various types of data output to the MFP 100 are processed, stored, and output for each of various use cases.

Scanner Input→Plotter Output Operation

A user sets a document in the scanning device 101, performs setting of a desired image processing mode and the like, and makes an input for copy starting for the operation display device 110. The operation display device 110 converts information that is input from the user into control command data used inside the apparatus, and issues the control command data. The issued control command data is notified to the CPU 106 through the PCI-Express bus. The CPU 106 sequentially performs settings and operations necessary for a copy operation by executing a program for a copy operation process in accordance with the control command data for copy starting. Hereinafter, the operation process will be sequentially described.

The characteristics of the digital image data of RGB, each having 8 bits acquired by scanning the document using the scanning device 101, are uniformized into predetermined characteristics by the first image data processing device 102; and the digital image data having the uniformized characteristics is transmitted to the bus control device 103. In addition, the first image data processing device 102 extracts information from the document if necessary.

Figure 2:
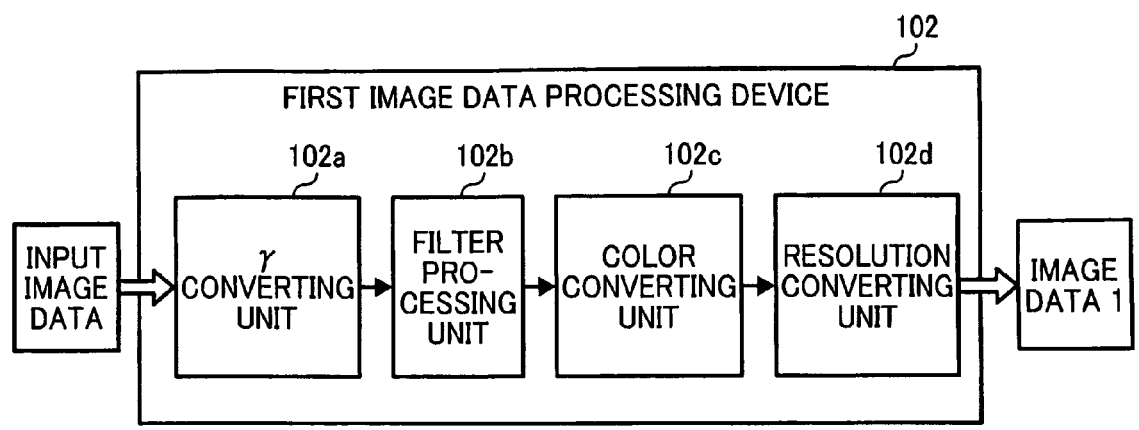
FIG. 2 is a block diagram showing a detailed structure of an image data processing device.
Figure 3:
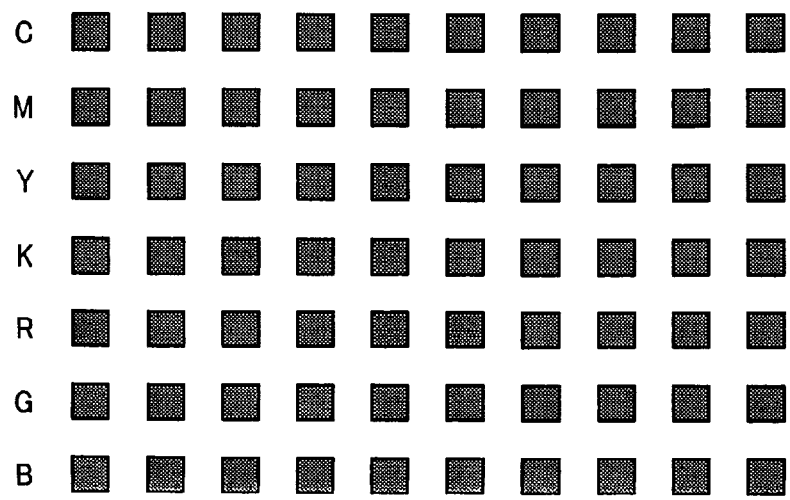
FIG. 3 is a diagram showing an example of reference charts used by the image data processing device.
Figure 4:
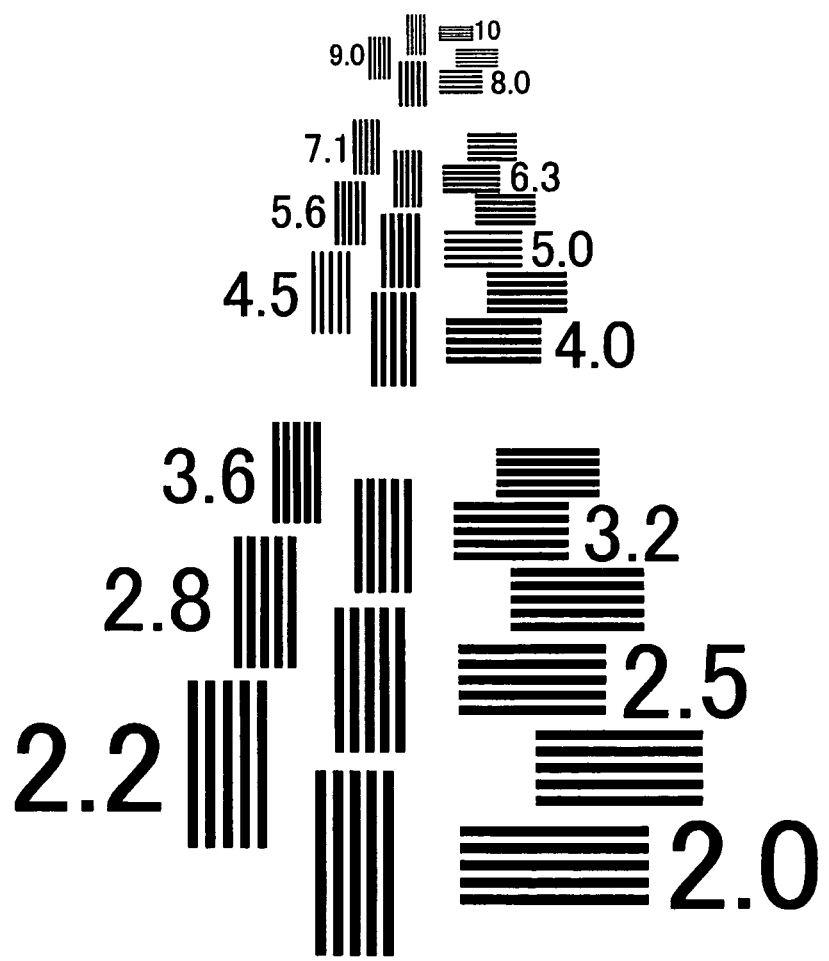
FIG. 4 is a diagram showing an example of reference charts used by the image data processing device.

FIG. 2 is a block diagram showing a detailed structure of an image data processing device 1. FIGS. 3 and 4 are diagrams showing an example of reference charts that is used by the first image data processing device. A γ converting unit 102a converts the γ characteristic of digital image data into a predetermined characteristic (for example, γ=2.2) from a characteristic on the basis of the reflectivity, by performing γ conversion for the input digital image data that is input from the scanning device 101. In this embodiment, the γ converting unit 102a converts the γ characteristic of the digital image data such that the γ characteristic of digital image data becomes a predetermined γ characteristic when the reference chart as shown in FIG. 3 is scanned.

A filter processing unit 102b corrects the characteristics of the scanning device 101 such as MTF characteristics into predetermined characteristics by performing filter processing for the digital image data. In this embodiment, the filter processing unit 102b converts digital image data so as to have MTF characteristics that are predetermined for each number of lines when the pattern of a reference chart as shown in FIG. 4 is scanned.

A color converting unit 102c converts the color space of the digital image data generated by the scanning device 101 into a predetermined color space. Here, it is preferable that the predetermined color space is as large as possible, so that clipping or compression does not occur in the input digital image data. However, when the predetermined color space is excessively large, a problem of a gradation level difference occurs. Thus, in this embodiment, the color converting unit 102c converts the color space of the digital image data such that the color space becomes AdobeRGB that is one of standard color spaces when the reference chart as shown in FIG. 3 is scanned.

A resolution converting unit 102d converts the resolution of the digital image data input from the scanning device 101 into a predetermined resolution. In this embodiment, the resolution converting unit 102d converts the resolution of the input digital image data into 600 dpi all the time. However, the resolution converting unit 102d may convert the resolution into a different resolution.

The digital image data of RGB, each having 8 bits and having characteristics that are uniformized by the first image data processing device 102, is transmitted to the bus control device 103. When receiving the digital image data of RGB, each in 8 bits, transmitted from the first image data processing device 102; the bus control device 103 expands the digital image data in the memory 107 through the CPU 106. In addition, the bus control device 103 stores the digital image data of RGB, each being in 8 bits and expanded in the memory 107 in the HDD 105 if necessary as image data before editing and processing, in order to respond to a user's storage instruction not only for the present use but also for later use, for synchronous transmission to a plurality of output destinations, or for the like.

In addition, the bus control device 103 not only stores the digital image data of RGB each having 8 bits in the HDD 105 but also stores a thumbnail image data acquired by reducing the resolution of the digital image data of RGB each having 8 bits in the HDD 105, in association with the digital image data before editing and processing of RGB each having 8 bits for use of an image search and the like. Since the file size of the thumbnail is small, the thumbnail may be configured so as to be stored in the HDD 105 all the time regardless of the necessity of storage of the digital image data of RGB each having 8 bits. The generation of the thumbnail is performed through resolution conversion of the digital image data of RGB each having 8 bits stored in the HDD 105 and conversion of the color space of the digital image data into an sRGB color space by the CPU 106. However, the generation of the thumbnail may be performed by using a color converting unit 104b and a resolution converting unit 104c of the second image data processing device 104 to be described later. In this embodiment, it is assumed that two types of thumbnails having resolutions of 72 dpi and 144 dpi are generated by the CPU 106.

The image data of RGB, each having 8 bits expanded into the memory 107, is transmitted to the second image data processing device 104 through the CPU 106 and the bus control device 103. Then, the second image data processing device 104 converts the received digital image data of RGB, each having 8 bits, into digital image data of CMYK, each having 8 bits, for plotter output and outputs the converted digital image data. In addition, at the time of transmitting the digital image data through a data bus such as the bus control device 103 or an ATA bus, and at the time of storage of the digital image data into the HDD 105, or the like, the CPU 106 may be configured to perform a compression or decompression process of the digital image data if necessary, thereby efficiently handling the digital image data.

Figure 5:
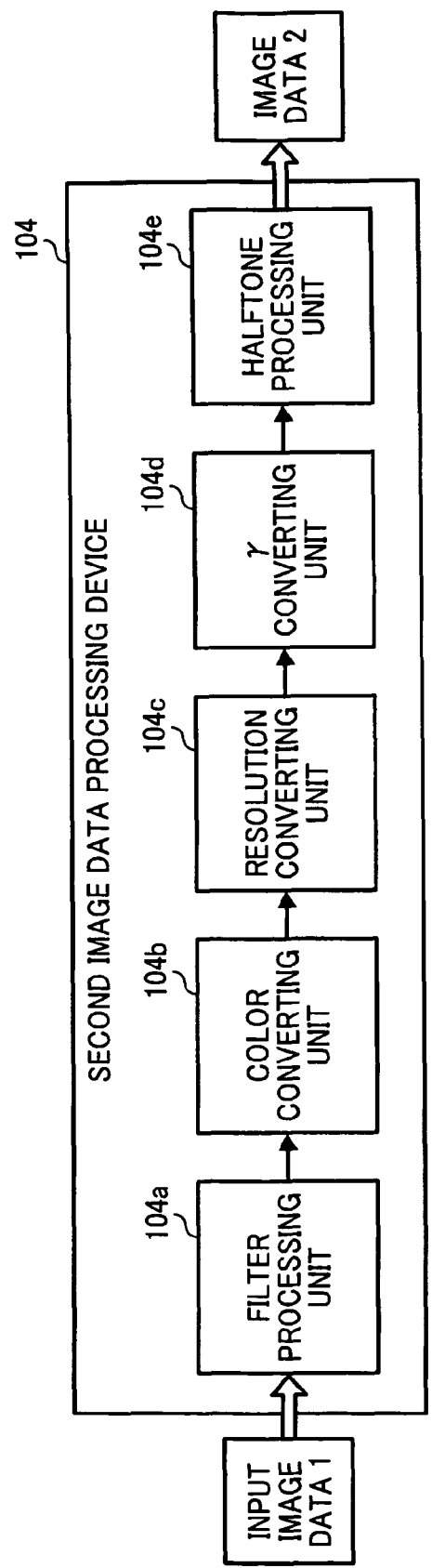
FIG. 5 is a block diagram showing a detailed structure of an image data processing device.

FIG. 5 is a block diagram showing a detailed structure of the second image data processing device. A filter processing unit 104a corrects the sharpness or the S/N ratio of the image data of RGB each having 8 bits so as to improve the reproducibility of the image data in the case in which the image data is output to the plotter device 109. More specifically, the filter processing unit 104a performs a sharpening or smoothing process for the digital image data of RGB each having 8 bits depending on a desired image processing mode (for example, a text mode, a photograph mode, or the like). For example, the filter processing unit 104a performs a sharpening process so as to have a text to be clear and distinctive in the text mode; and performs a smoothing process so as to smoothly represent the gradation in the photograph mode.

When receiving the digital image data (input image data) of RGB each having 8 bits, the color converting unit 104b converts the received digital image data into digital image data (output image data) of CMYK each having 8 bits that is a color space for the plotter device 109. More specifically, the color converting unit 104b converts the received digital image data of RGB each having 8 bits into digital image data of CMYK each having 8 bits when the color mode is a color output mode and converts the digital image data of RGB each having 8 bits into digital image data of a K mono color when the color mode is a monochrome output mode.

The resolution converting unit 104c converts the resolution of the digital image data of CMYK, each having 8 bits, which is acquired by the color converting unit 104b, based on the performance of the plotter device 109. In this embodiment, since the performance of the plotter device 109 is 600 dpi output, the resolution converting unit 104c does not perform any particular conversion.

A γ converting unit 104d corrects the γ characteristics of the digital image data of CMYK each having 8 bits into the process characteristics of the plotter device 109.

A halftone processing unit 104e performs a halftone process according to the gradation processing capability of the plotter device 109 for the digital image data of CMYK each having 8 bits. In this embodiment, the halftone processing unit 104e converts the digital image data of CMYK each having 8 bits into digital image data of CMYK each having 2 bits using an error diffusion method that is one of pseudo halftone processes. Then, the halftone processing unit 104e (the second image data processing device 104) transmits the digital image data of CMYK each having 2 bits for which the halftone process has been performed to the bus control device 103.

When receiving the digital image data of CMYK each having 2 bits from the second image data processing device

104, the bus control device 103 expands the received digital image data of CMYK each having 2 bits in the memory 107 through the CPU 106. Then, the image data of CMYK, each having two bits expanded into the memory 107, is transmitted to the plotter device 109 through the CPU 106 and the plotter I/F device 108. In addition, the bus control device 103 stores the digital image data of CMYK, each having 2 bits, in the HDD 105 if necessary as image data, on which editing and processing have been completed in accordance with a user's storage instruction for later re-output. In addition, the bus control device 103 also stores thumbnails of the image data, on which editing and processing have been completed, similarly to the digital image data before editing and processing of RGB each having 8 bits, that are acquired by reducing the resolution of the image data in the HDD 105 in association with the image data on which editing and processing have been completed. In addition, the thumbnails are generated by performing resolution conversion and color space conversion into the sRGB color space for the digital image data of CMYK each having 2 bits by using the CPU 106. In this embodiment, it is assumed that the CPU 106 generates two types of thumbnails having resolutions of 72 dpi and 144 dpi. Here, when the digital image data of CMYK, each having 2 bits on which image processing has been performed, is converted into the sRGB color space depending on the device (the plotter device 109), the image quality deteriorates. Thus, in the case in which the user gives importance to the image quality of the thumbnails, the second image data processing device 104 may directly generate the thumbnails by performing resolution conversion and color space conversion into the sRGB color space for the digital image data before editing and processing of RGB each having 8 bits.

The plotter device 109 outputs the digital image data of CMYK, each having 2 bits which is received from the plotter I/F device 108, to a transfer sheet, and thereby generating a copy of the document.

Scanner Input→Facsimile Transmission Operation

The user sets a document in the scanning device 101, performs setting of a desired image processing mode and the like, and makes an input to start a facsimile with the use of the operation display device 110. The operation display device 110 converts information that is input from the user into control command data used inside the apparatus, and issues the control command data. The issued control command data is notified to the CPU 106 through the PCI-Express bus. The CPU 106 sequentially performs settings and operations necessary for a facsimile transmission operation by executing a program for a facsimile transmission operation process in accordance with the control command data for starting the facsimile. Hereinafter, the operation process will be sequentially described.

The characteristics of the digital image data of RGB, each having 8 bits acquired by scanning the document using the scanning device 101, are uniformized to predetermined characteristics by the first image data processing device 102; and the digital image data having the uniformized characteristics is transmitted to the bus control device 103. In addition, the first image data processing device 102 extracts information from the document if necessary. Since a detailed process performed by the first image data processing device 102 is equivalent to that as described in the section "Scanner Input→Plotter Output Operation."), the description thereof will not be repeated here.

The digital image data of RGB, each having 8 bits which has been subjected to the uniformizing of characteristics performed by the first image data processing device 102, is transmitted to the bus control device 103. When receiving the digital image data of RGB each having 8 bits transmitted from the first image data processing device 102, the bus control device 103 expands the digital image data in the memory 107 through the CPU 106. In addition, the bus control device 103 stores the digital image data of RGB each having 8 bits expanded in the memory 107 in the HDD 105 as image data before editing and processing if necessary, in order to respond to a user's storage instruction not only for the present use but also for later use, for synchronous transmission to a plurality of output destinations, or for the like.

In addition, the bus control device 103 not only stores the digital image data of RGB each having 8 bits in the HDD 105 but also stores a thumbnail image data that is acquired by reducing the resolution of the digital image data of RGB each having 8 bits in the HDD 105 in association with the digital image data before editing and processing of RGB each having 8 bits for an image search or the like. Since the file size of the thumbnail is small, the thumbnail may be configured so as to be stored in the HDD 105 all the time regardless of the necessity of storage of the digital image data of RGB each having 8 bits. The generation of the thumbnail is performed through resolution conversion of the digital image data of RGB each having 8 bits stored in the HDD 105 and conversion of the color space of the digital image data into an sRGB color space by the CPU 106. However, the generation of the thumbnail may be performed by using a color converting unit 104b and a resolution converting unit 104c of the second image data processing device 104 to be described later. In this embodiment, it is assumed that two types of thumbnails having resolutions of 72 dpi and 144 dpi are generated by the CPU 106.

The digital image data of RGB each having 8 bits stored in the memory 107 is transmitted to the second image data processing device 104 through the CPU 106 and the bus control device 103. Then, the second image data processing device 104 converts the received digital image data of RGB each having 8 bits into digital image data having monochrome binary values for facsimile transmission, and outputs the converted digital image data. In addition, at the time of transmission of the digital image data through a data bus such as the bus control device 103 or an ATA bus; of the storage of the digital image data into the HDD 105, or of the like, the CPU 106 may be configured to perform a compression or decompression process of the digital image data if necessary, thereby efficiently handling the digital image data.

Here, image processing that is necessary for facsimile transmission will be sequentially described again with reference to FIG. 5. The filter processing unit 104a corrects the sharpness of the image data of RGB each having 8 bits so as to improve the reproducibility of the image data in the case of facsimile transmission. More specifically, the filter processing unit 104a performs a sharpening or smoothing process for the digital image data of RGB each having 8 bits in accordance with a desired image processing mode (for example, a text mode, a photograph mode, or the like). For example, the filter processing unit 104a performs a sharpening process so as for a text to become clear and distinctive in the text mode, and performs a smoothing process so as to smoothly be represented the gradation in the photograph mode.

When receiving the digital image data of RGB each having 8 bits, the color converting unit 104b converts the received digital image data into digital image data having general monochrome (black and white) 8 bits, which is used in the facsimile device 115. However, in the case in which the transmission destination of the facsimile device 115 is a color facsimile, the color converting unit 104b may perform the same color conversion as that performed in the case in which the image data is output to the plotter device 109. More specifically, the color converting unit 104b converts the digital image data of RGB each having 8 bits so as to reproduce the digital image data in RGB when the color mode is the color output mode and converts the digital image data of RGB each having 8 bits so as to reproduce the digital image data in gray scales when the color mode is the monochrome output mode.

The resolution converting unit 104c converts the resolution of the digital image data of monochrome 8 bits into a resolution that is appropriate for transmission and reception by the facsimile device 115. In this embodiment, the resolution converting unit 104c converts the resolution of the digital image data of monochrome 8 bits into a resolution of 200 dpi (in main scanning)×100 dpi (in sub-scanning).

The γ converting unit 104d corrects the γ characteristics of the digital image data of monochrome 8 bits such that the reproducibility is improved in the case of facsimile transmission. For example, the γ converting unit 104d corrects the digital image data so as to increase the contrast of the digital image data for having a text to be clear and distinctive in the case in which the image processing mode is the text mode and corrects the digital image data in a slightly laying-down manner for smoothly representing the gradation in the case in which the image processing mode is the photograph mode.

When receiving the digital image data of monochrome 8 bits, the halftone processing unit 104e performs a halftone process according to the gradation processing capability of the facsimile device 115 for the received digital image data of monochrome 8 bits. In this embodiment, the halftone processing unit 104e converts the digital image data of monochrome 8 bits into binary digital image data using an error diffusion method that is one of pseudo halftone processes. In addition, in the case in which the digital image data is output to a facsimile device 115 capable of outputting colors, the halftone processing unit 104e outputs the digital image data of monochrome 8 bits without performing a halftone process for the digital image data.

When receiving the binary digital image data from the second-image data processing device 104, the bus control device 103 expands the received binary digital image data in the memory 107 through the CPU 106. Then, the binary digital image data expanded in the memory 107 is transmitted to the line I/F device 111 through the CPU 106. In addition, the bus control device 103 stores the binary digital image data in the HDD 105 if necessary as image data, on which editing and processing have been completed, for later re-output in accordance with a user's storage instruction. In addition, the bus control device 103 also stores thumbnails of the image data, on which editing and processing have been performed, similarly to the digital image data before editing and processing of RGB each having 8 bits, that are acquired by reducing the resolution of the image data in the HDD 105 in association with the image data on which editing and processing have been performed. In addition, the thumbnails are generated by performing resolution conversion and color space conversion into the sRGB color space for the binary digital image data by using the CPU 106. In this embodiment, it is assumed that the CPU 106 generates two types of thumbnails having resolutions of 72 dpi and 144 dpi. Here, when the binary digital image data having a low resolution is converted into the sRGB color space, the image quality deteriorates. Thus, in the case in which the user gives importance to the image quality of the thumbnails, the second image data processing device 104 may directly generate the thumbnails by performing resolution conversion and color space conversion into the sRGB color space for the digital image data before editing and processing of RGB each having 8 bits.

The line I/F device 111 transmits the binary digital image data, received from the bus control device 103, to the facsimile device 115 that is connected through a line in conformity with a transmission protocol.

Scanner Input→Scanner Delivery Operation

The user sets a document in the scanning device 101, performs setting of a desired image processing mode and the like, and makes an input to start for scanner delivery with the use of the operation display device 110. The operation display device 110 converts information that is input from the user into control command data used inside the apparatus and issues the control command data. The issued control command data is notified to the CPU 106 through the PCI-Express bus. The CPU 106 sequentially performs settings and operations necessary for a scanner delivery operation by executing a program for a scanner delivery operation process in accordance with the control command data for scanner delivery starting. Hereinafter, the operation process will be sequentially described.

The characteristics of the digital image data of RGB, each having 8 bits acquired by scanning of the document using the scanning device 101, are uniformized to predetermined characteristics by the first image data processing device 102; and the digital image data having the uniformized characteristics is transmitted to the bus control device 103. In addition, the first image data processing device 102 extracts information from the document if necessary. Since a detailed process performed by the first image data processing device 102 is equivalent to that as described in the section "Scanner Input→Plotter Output Operation," the description thereof will not be repeated here.

The digital image data of RGB, each having 8 bits of which the characteristics are uniformized by the first image data processing device 102, is transmitted to the bus control device 103. When receiving the digital image data of RGB each having 8 bits transmitted from the first image data processing device 102, the bus control device 103 expands the digital image data in the memory 107 through the CPU 106. In addition, the bus control device 103 stores the digital image data of RGB each having 8 bits expanded in the memory 107 in the HDD 105 as image data before editing and processing if necessary, in order to respond to a user's storage instruction not only for the present use but also for later use, synchronous transmission to a plurality of output destinations, or the like.

In addition, the bus control device 103 not only stores the digital image data of RGB each having 8 bits in the HDD 105 but also stores a thumbnail acquired by reducing the resolution of the digital image data of RGB each having 8 bits in the HDD 105, in association with the digital image data before editing and processing of RGB each having 8 bits for an image search and the like. Since the file size of the thumbnail is small, the thumbnail may be configured so as to be stored in the HDD 105 all the time regardless of the necessity of storage of the digital image data of RGB each having 8 bits. The generation of the thumbnail is performed through resolution conversion of the digital image data of RGB each having 8 bits stored in the HDD 105 and color space conversion of the digital image data into an sRGB color space by the CPU 106. However, the generation of the thumbnail may be performed by using a color converting unit 104b and a resolution converting unit 104c of the second image data processing device 104 to be described later. In this embodiment, it is assumed that two types of thumbnails having resolutions of 72 dpi and 144 dpi are generated by the CPU 106.

The image data of RGB each having 8 bits stored in the memory 107 is transmitted to the second image data processing device 104 through the CPU 106 and the bus control device 103. Then, the second image data processing device 104 converts the received digital image data of RGB each having 8 bits into digital image data for scanner delivery (for example, RGB multiple values, gray scales, monochrome binary values, or the like); and outputs the converted digital image data.

Here, image processing that is necessary for scanner delivery will be sequentially described again with reference to FIG. 5. The filter processing unit 104a corrects the sharpness of the image data of RGB each having 8 bits so as to improve the reproducibility of the image data in the case of scanner delivery. More specifically, the filter processing unit 104a performs a sharpening or smoothing process for the digital image data of RGB each having 8 bits in accordance with a desired image processing mode (for example, a text mode, a photograph mode, or the like). For example, the filter processing unit 104a performs a sharpening process so as to have a text to be clear and distinctive in the text mode and performs a smoothing process so as to smoothly represent the gradation in the photograph mode.

When receiving the digital image data of RGB each having 8 bits, the color converting unit 104b converts the received digital image data into a color space that is designated in advance. In this embodiment, the color converting unit 104b converts the received digital image data into digital image data of sRGB each having 8 bits that is generally used for scanner delivery. However, similarly to the above-described case of outputting data to the plotter device 109 or the facsimile device 115, the color converting unit 104b may perform conversion into various color spaces other than the sRGB color space such as digital image data of a gray scale or monochrome binary digital image data. More specifically, the color converting unit 104b converts the digital image data of RGB each having 8 bits so as to reproduce the digital image data in the sRGB when the color mode is the color output mode and converts the digital image data of RGB each having 8 bits so as to reproduce the digital image data in gray scales when the color mode is the monochrome output mode.

The resolution converting unit 104c converts the resolution of sRGB, each having 8 bits into a predetermined resolution that is appropriate for transmission and reception for scanner delivery. In this embodiment, the resolution converting unit 104c converts the resolution of the digital image data of sRGB each having 8 bits into a resolution of 200 dpi (in main scanning)×200 dpi (in sub-scanning).

The γ converting unit 104d corrects the γ characteristics of the digital image data of sRGB each having 8 bits such that the reproducibility is improved in the case of scanner delivery. In this embodiment, since colors are already matched in the sRGB color space, correction by the γ converting unit 104d is not performed.

The halftone processing unit 104e performs a halftone process according to the halftone processing capability that is transmitted and received in scanner delivery designated in advance for the digital image data of sRGB each having 8 bits. In this embodiment, since 160,000 colors of RGB each having 8 bits are designated, the halftone processing unit 104e does not particularly perform a gradation process.

When receiving the digital image data of sRGB each having 8 bits from the second image data processing device 104, the bus control device 103 expands the received digital image data of sRGB each having 8 bits in the memory 107 through the CPU 106. Then, the digital image data of sRGB, each having 8 bits expanded in the memory 107, is transmitted to the external I/F device 112 through the CPU 106. In addition, the bus control device 103 stores the digital image data of sRGB each having 8 bits in the HDD 105 if necessary as image data, on which editing and processing have been completed, for later re-output in accordance with a user's storage instruction. In addition, the bus control device 103 also stores thumbnails of the image data, on which editing and processing have been completed, similarly to the digital image data before editing and processing of RGB each having 8 bits, that are acquired by reducing the resolution of the image data in the HDD 105 in association with the image data on which editing and processing have been completed. In addition, the thumbnails are generated by performing resolution conversion and color space conversion into the sRGB color space for the digital image data of sRGB each having 8 bits by using the CPU 106. In this embodiment, it is assumed that the CPU 106 generates two types of thumbnails having resolutions of 72 dpi and 144 dpi. In this embodiment, since the color space of the image data on which editing and processing have been completed is the sRGB color space, so that the CPU 106 does not need to perform color space conversion into the sRGB color space. Here, when thumbnails are generated from the digital image data of sRGB each having 8 bits that has a low resolution, the image quality deteriorates. Thus, in the case in which the user gives importance to the image quality of the thumbnails, the second image data processing device 104 may directly generate the thumbnails by performing resolution conversion and color space conversion into the sRGB color space for the digital image data before editing and processing of RGB each having 8 bits.

The external I/F device 112 transmits the digital image data of sRGB, each having 8 bits that is received from the bus control device 103 to the PC 116 that is connected through a network.

External I/F Input→Plotter Output Operation

The user connects the external medium 117 on which digital image data of RGB each having 8 bits is recorded through the external I/F device 112, performs setting of a desired image processing mode and the like; and makes an input to start printing with the use of the operation display device 110. In the case of printing output from the PC 116, the user performs the setting of the desired image processing mode and the like and makes the input to start printing by using the PC 116.

The operation display device 110 converts information that is input from the user into control command data used inside the apparatus and issues the control command data. The issued control command data is notified to the CPU 106 through the PCI-Express bus. The CPU 106 sequentially performs settings and operations necessary for a printing operation by executing a program for a printing operation process in accordance with the control command data for print starting. Hereinafter, the operation process will be sequentially described.

The digital image data on the basis of a standard color space of RGB each having 8 bits acquired from the external medium 117 through the external I/F device 112, or the digital image data on the basis of the standard color space of RGB each having 8 bits, on which rendering has been completed and which has been printed out from the PC 116 is expanded in the memory 107 through the CPU 106 whose standard color space being maintained. Although there are various definitions of the standard color space, generally an sRGB color space and an AdobeRGB color space are frequently used. When the color space of the input digital image data is other than the assumed standard color space, the digital image data of RGB each having 8 bits that is expanded in the memory 107 is transmitted to the second image data processing device 104 through the CPU 106 and the bus control device 103, is converted into a standard color space set by the user; and is expanded in the memory 107 again. In addition, the bus control device 103 stores the digital image data of RGB each having 8 bits that is expanded in the memory 107 in the HDD 105 if necessary as image data before editing and processing for a user's storage instruction not only for the present use but also for later use, for synchronous transmission to a plurality of output destinations, or for the like.

In addition, the bus control device 103 not only stores the digital image data of RGB each having 8 bits in the HDD 105 but also stores a thumbnail acquired by reducing the resolution of the digital image data of RGB each having 8 bits in the HDD 105, in association with the digital image data before editing and processing of RGB each having 8 bits for an image search and the like. Since the file size of the thumbnail is small, the thumbnail may be configured so as to be stored in the HDD 105 all the time regardless of the necessity of storage of the digital image data of RGB each having 8 bits. The generation of the thumbnail is performed through resolution conversion of the digital image data of RGB each having 8 bits stored in the HDD 105 and color space conversion of the digital image data into an sRGB color space by the CPU 106. However, the generation of the thumbnail may be performed by using a color converting unit 104b and a resolution converting unit 104c of the second image data processing device 104. In this embodiment, it is assumed that two types of thumbnails having resolutions of 72 dpi and 144 dpi are generated by the CPU 106.

The digital image data of RGB each having 8 bits expanded into the memory 107 is transmitted to the second image data processing device 104 through the CPU 106 and the bus control device 103. Then, the second image data processing device 104 converts the received digital image data of RGB, each having 8 bits into digital image data of CMYK each having 2 bits for plotter output; and then outputs the converted digital image data. Since a detailed process performed by the second image data processing device 104 is equivalent to that as described in the section "Scanner Input→Plotter Output Operation," the description thereof will not be repeated here.

When receiving the digital image data of CMYK each having 2 bits from the second image data processing device 104, the bus control device 103 expands the received digital image data in the memory 107 through the CPU 106. Then, the digital image data of CMYK each having two bits expanded in the memory 107 is transmitted to the plotter device 109 through the CPU 106 and the plotter I/F device 108. In addition, the bus control device 103 stores the digital image data of CMYK each having 2 bits in the HDD 105 if necessary as image data, on which editing and processing have been completed, for later re-output in accordance with a user's storage instruction. In addition, the bus control device 103 also stores thumbnails of the image data, on which editing and processing have been completed, similarly to the image data before editing and processing, in the HDD 105 in association with the image data on which editing and processing have been completed. In addition, the thumbnails are generated by performing resolution conversion and color space conversion into the sRGB color space for the digital image data of CMYK each having 2 bits by using the CPU 106. In this embodiment, it is assumed that the CPU 106 generates two types of thumbnails having resolutions of 72 dpi and 144 dpi. Here, when the digital image data of CMYK each having 2 bits on which image processing has been performed is converted into the sRGB color space depending on the device (the plotter device 109), the image quality deteriorates. Thus, in the case in which the user gives importance to the image quality of the thumbnails, the second image data processing device 104 may directly generate the thumbnails by performing resolution conversion and color space conversion into the sRGB color space for the digital image data before editing and processing of RGB each having 8 bits.

The plotter device 109 outputs the digital image data of CMYK each having 2 bits received from the plotter I/F device 108 to a transfer sheet, and thereby generating a print of the digital image data of RGB each having 8 bits that is recorded on the external medium 117.

External I/F Input→Facsimile Transmission Operation

The user connects the external medium 117 on which digital image data of RGB each having 8 bits is recorded through the external I/F device 112; performs setting of a desired image processing mode and the like; and makes an input for print starting with the use of the operation display device 110. In the case of printing output data from the PC 116, the user performs the setting of the desired image processing mode and the like and makes the input for print starting by using the PC 116.

The operation display device 110 converts information that is input from the user into control command data used inside the apparatus and issues the control command data. The issued control command data is notified to the CPU 106 through the PCI-Express bus. The CPU 106 sequentially performs settings and operations necessary for a facsimile transmission operation by executing a program for a facsimile transmission operation process in accordance with the control command data for facsimile starting. Hereinafter, the operation process will be sequentially described.

Since a detailed process of expanding (storing) the digital image data of RGB, each having 8 bits that is acquired from the external medium 117 through the external I/F device 112, into the memory 107 and the HDD 105 is equivalent to that as described in the section "External I/F Input→Plotter Output Operation," the description thereof will not be repeated here.

The bus control device 103 stores the digital image data of RGB each having 8 bits expanded in the memory 107 in the HDD 105 as image data before editing and processing in accordance with the need for a user's storage instruction not only for the present use but also for later use, for synchronous transmission to a plurality of output destinations, or for the like.

In addition, the bus control device 103 not only stores the digital image data of RGB each having 8 bits in the HDD 105 but also stores a thumbnail acquired by reducing the resolution of the digital image data of RGB each having 8 bits in the HDD 105, in association with the digital image data before editing and processing for an image search and the like. Since the file size of the thumbnail is small, the thumbnail may be configured so as to be stored in the HDD 105 all the time regardless of the necessity of storage of the digital image data of RGB each having 8 bits. The generation of the thumbnail is performed through resolution conversion of the digital image data of RGB each having 8 bits stored in the HDD 105 and color space conversion of the digital image data into an sRGB color space by the CPU 106. However, the generation of the thumbnail may be performed by using a color converting unit 104b and a resolution converting unit 104c of the second image data processing device 104. In this embodiment, it is assumed that two types of thumbnails having resolutions of 72 dpi and 144 dpi are generated by the CPU 106.

The digital image data of RGB each having 8 bits expanded in the memory 107 is transmitted to the second image data processing device 104 through the CPU 106 and the bus control device 103. Then, the second image data processing device 104 converts the received digital image data of RGB each having 8 bits into digital image data having monochrome binary values for facsimile transmission and outputs the converted digital image data. Since a detailed process performed by the second image data processing device 104 is equivalent to that as described in the section "Scanner Input→Facsimile Transmission Operation," the description thereof will not be repeated here.

When receiving the monochrome binary digital image data from the second image data processing device 104, the bus control device 103 expands the received monochrome binary digital image data in the memory 107 through the CPU 106. Then, the monochrome binary digital image data expanded in the memory 107 is transmitted to the line I/F device 111 through the CPU 106. In addition, the bus control device 103 stores the monochrome binary digital image data also in the HDD 105 if necessary as image data, on which editing and processing have been completed, for later re-output in accordance with a user's storage instruction. In addition, the bus control device 103 also stores thumbnails of the image data, on which editing and processing have been completed, similarly to the image data before editing and processing, in the HDD 105 in association with the image data on which editing and processing have been completed. The thumbnails are generated by performing resolution conversion and color space conversion into the sRGB color space for the monochrome binary digital image data by using the CPU 106. In this embodiment, it is assumed that the CPU 106 generates two types of thumbnails having resolutions of 72 dpi and 144 dpi. Here, when the monochrome binary digital image data having a low resolution is converted into the sRGB color space, the image quality deteriorates. Thus, in the case in which the user gives importance to the image quality of the thumbnails, the second image data processing device 104 may directly generate the thumbnails by performing resolution conversion and color space conversion into the sRGB color space for the digital image data before editing and processing of RGB each having 8 bits.

The line I/F device 111 transmits the monochrome binary digital image data received from the CPU 106 to the facsimile device 115 that is connected through a line.

External I/F Input→Scanner Delivery Operation

The user connects the external medium 117 on which digital image data of RGB each having 8 bits is recorded through the external I/F device 112; performs setting of a desired image processing mode and the like; and makes an input for print starting with the use of the operation display device 110. In the case of printing output data from the PC 116, the user performs the setting of the desired image processing mode and the like; and makes the input for print starting by using the PC 116.

The operation display device 110 converts information that is input from the user into control command data used inside the apparatus and issues the control command data. The issued control command data is notified to the CPU 106 through the PCI-Express bus. The CPU 106 sequentially performs settings and operations necessary for a scanner delivery operation by executing a program for a scanner delivery operation process in accordance with the control command data for scanner delivery starting.

Since a detailed process of expanding (storing) the digital image data of RGB each having 8 bits that is acquired from the external medium 117 through the external. I/F device 112 into the memory 107 and the HDD 105 is equivalent to that as described in the section "External I/F Input→Plotter Output Operation," the description thereof will be not be repeated here.

The bus control device 103 stores the digital image data of RGB each having 8 bits expanded in the memory 107 in the HDD 105 as image data before editing and processing in accordance with the need for a user's storage instruction not only for the present use but also for later use, for synchronous transmission to a plurality of output destinations, or for the like.

In addition, the bus control device 103 not only stores the digital image data of RGB each having 8 bits in the HDD 105 but also stores a thumbnail acquired by reducing the resolution of the digital image data of RGB each having 8 bits in the HDD 105, in association with the digital image data before editing and processing for an image search and the like. Since the file size of the thumbnail is small, the thumbnail may be configured so as to be stored in the HDD 105 all the time regardless of the necessity of storage of the digital image data of RGB each having 8 bits. The generation of the thumbnail is performed through resolution conversion of the digital image data of RGB each having 8 bits stored in the HDD 105 and color space conversion of the digital image data into an sRGB color space by the CPU 106. However, the generation of the thumbnail may be performed by using a color converting unit 104b and a resolution converting unit 104c of the second image data processing device 104. In this embodiment, it is assumed that two types of thumbnails having resolutions of 72 dpi and 144 dpi are generated by the CPU 106.

The image data of RGB each having 8 bits stored in the memory 107 is transmitted to the second image data processing device 104 through the CPU 106 and the bus control device 103. Then, the second image data processing device 104 converts the received digital image data of RGB each having 8 bits into digital image data for scanner delivery (for example, RGB multiple values, gray scales, monochrome binary values, or the like) and outputs the converted digital image data. Since a detailed process performed by the second image data processing device 104 is equivalent to that as described in the section of "Scanner Input→Scanner Delivery Operation," the description thereof will not be repeated here.

When receiving the image data for scanner delivery from the second image data processing device 104, the bus control device 103 expands the received image data into the memory 107 through the CPU 106. Then, the image data for scanner delivery expanded into the memory 107 is transmitted to the external I/F device 112 through the CPU 106. In addition, the bus control device 103 stores the image data for scanner delivery also in the HDD 105 if necessary as image data, on which editing and processing have been completed, for later re-output in accordance with a user's storage instruction. In addition, the bus control device 103 also stores thumbnails of the image data, on which editing and processing have been completed, similarly to the image data before editing and processing, in the HDD 105 in association with the image data on which editing and processing have been completed. The thumbnails are generated by performing resolution conversion and color space conversion into the sRGB color space for the image data for scanner delivery by using the CPU 106. In this embodiment, it is assumed that the CPU 106 generates two types of thumbnails having resolutions of 72 dpi and 144 dpi. In this embodiment, since the color space of the image data for scanner delivery is originally the sRGB color space, there is no need for conversion. Here, when the thumbnails are generated from the image data of the sRGB color space having a low resolution, the image quality deteriorates. Thus, in the case in which the user gives importance to the image quality of the thumbnails, the second image data processing device 104 may directly generate the thumbnails by performing resolution conversion and color space conversion into the sRGB color space for the digital image data before editing and processing of RGB each having 8 bits.

The external I/F device 112 transmits the image data of the sRGB color space that is received from the CPU 106 to the PC 116 that is connected through a network.

For each use case described as above, the process is started from an input device of the image data, that is, the input from the scanning device 101 or input from the external I/F device 112. However, the process may be started from the image data that is stored in the HDD 105 or the memory 107 for re-output.

For example, as an example in which the process is started from the image data stored in the HDD 105 or the memory 107, an aggregated output operation will be described. As aggregated output of a plurality of documents, there are many types including a type in which two documents are packed into one sheet and a type in which eight documents are packed into one sheet. However, here, the case in which two documents in A4 size are packed into one sheet of A4 size, that is, the case of "two-in-one" output will be described.

First, the CPU 106 reads out image data of two documents of A4 size that is stored in the HDD 105 through the bus control device 103; and generates output image data by using the second image data processing device 104. Since the second image data processing device 104 packs two documents of A4 into one sheet of A4, the resolution converting unit 104*c* converts image data of 600 dpi into image data of 300 dpi, in other words, performs 50%-reduction magnification.

Next, when receiving the image data that is aggregated and combined and has a resolution converted by the second image data processing device 104, the bus control device 103 expands the received image data into the memory 107 through the CPU 106. Then, by arranging and outputting the image data corresponding to two documents, "two-in-one output" can be performed. Here, arranging and outputting the image data corresponding to two documents may be achieved by actually arranging and expanding the image data corresponding to two documents into the memory or continuously reading out image data from the memory 107 at the time of outputting the image data.

As another example, in the case in which "two-in-one" output is performed in which two documents of A4 is packed into one sheet of A3, the two documents of A4 can be arranged without performing any resolution conversion for the documents, and accordingly, output is performed with the resolution being maintained at 600 dpi (no magnification).

For easy understanding of the operation of the aggregated output, processes other than the resolution conversion is not changed depending on the number of documents to be aggregated. However, in order to further improve the image quality, image processing parameters of the filter processing performed by the filter processing unit 104*a*, the color conversion performed by the color converting unit 104*b*, and the like may be adjusted depending on the resolution conversion according to the aggregation.

Although various use cases of the MFP 100 have been described, the use cases are not limited thereto. Thus, there is also a use case in which image data is input to the MFP 100 without any determined purpose. In such a case, the input image data may be stored only in the HDD 105, and the stored image data can be used as needed next time.

Figure 6:
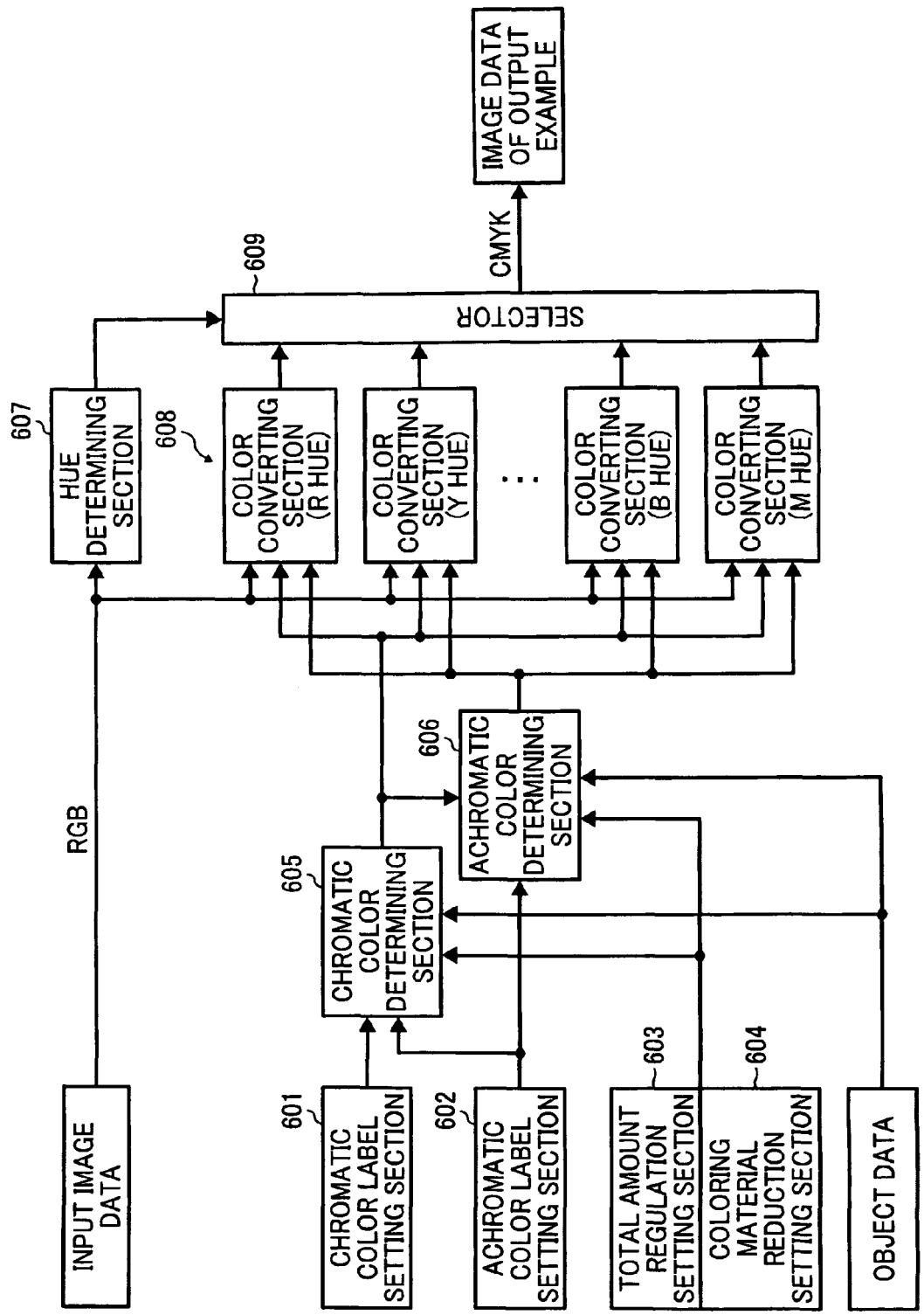
FIG. 6 is a block diagram representing a detailed structure of a color converting unit.

Next, a detailed structure of the color converting unit 104*b* included in the second image data processing device 104 will be described. FIG. 6 is a block diagram representing a detailed structure of the color converting unit. In this embodiment, defined values (vectors) of colors included in the input image data of the color converting unit 104*b* are quantitative values of the colors included in the input image data in the RGB color space (input color space). On the other hand, defined values (vectors) of colors included in the output image data of the color converting unit 104*b* are quantitative values of the colors included in the output image data in the CMYK color space (output color space) in the case in which the image data is output to a transfer sheet by the plotter device 109 and are quantitative values of colors included in the output image data in the RGB color space (output color space) in the case in which the image data is transmitted to the facsimile device 115, the PC 116, or the like.

Here, as the defined values of the colors included in the image data, vectors is used which are uniquely determined in accordance with the color space; and indicate the hue boundaries of the colors included in the image data. However, the defined values of the colors included in the image data may be matched to the data format of the image data, and, for example, can be values that are defined by Lab or Ycc. In this embodiment, in the case in which the image data is output to a transfer sheet by the plotter device 109 (that is, in the case in which quantitative values in the CMYK color space are applied to the defined values of the colors included in the output image data) will be described. However, in the case in which the image data is transmitted to the facsimile device 115 or the PC 116, the quantitative values in the CMYK color space may be substituted by quantitative values in the RGB color space.

A chromatic color label setting section 601 and an achromatic color label setting section 602 set color indices representing the categories to which colors (an achromatic color and chromatic colors) termed "red", "green", "blue", and "black" included in the output image dada belong in the case in which the image data including the achromatic color and at least one chromatic color is output (for example, in the case in which two-color printing is performed). In other words, the chromatic color label setting section 601 and the achromatic color label setting section 602 serve as interfaces sharing the concepts of colors indicated by the user. In addition, the setting of the color indices may be performed by the user through the operation display device 110 or the like in the case in which stamping of "for internal use only" or the like is performed in a red color for an input monochrome image or the like, or the color indices may be directly detected from a document or data of the printer or the like that is externally input. As a method of detecting color indices from a document or data, a known technology is used. For example, defined values of colors are registered for each color index, the defined values of the colors for each registered color index and the defined values of the colors included in the image data are compared to each other, and the color index of the color for which the defined values of the color coincide with each other is detected.

A total amount regulation setting section 603 sets a total amount regulating value used for regulating the total amount of defined values of colors in the output color space so as to prevent occurrence of problems such as toner scattering or ink bleeding in the case in which image data is output to a transfer sheet. In this embodiment, the total amount regulation setting section 603 sets the total amount regulating value of the defined values of colors in the output color space with a total amount regulating value of "100%" in the case in which the total amount of the defined values of the colors in the CMYK color space is "255" used as a reference.

In addition, the total amount regulation setting section 603 may change the total amount regulating value in accordance with information on objects for each pixel or region such as "picture and text", "image, graphic, and text", and the like (generally, the total amount regulation value of a text-based object is set to be stricter than that of a picture-based object. In other words, the amount of coloring materials used for outputting the text-based object is smaller than that for outputting a picture-based object).

A coloring material reduction setting section 604 sets output modes such as a toner save mode or an ink save mode (a save mode) in which the amount of the coloring material used for the output of the image data is reduced; a contrast enhancement mode in which the color contrast of the entire image data is increase; and uniformity enhancement mode in which the color tone of the entire image data is uniformized. In this embodiment, it is assumed that a value that is used as a reference when the output mode is set and the defined value of the color included in the image data is changed is set in advance. For example, in the case in which the save mode is set in two-color printing including red (a chromatic color) and black (an achromatic color) so as to decrease the amount of the coloring material by 50%, where as the defined value of the achromatic color included in the image data, (0,0,0,127) is used as a reference.

A chromatic color determining section 605 and an achromatic color determining section 606 adjust the color tone of the achromatic color belonging to the category that is indicated by the color index that is set by the achromatic color label setting section 602 in accordance with the hue of the chromatic color belonging to the category indicated by the color index that is set by the chromatic color label setting section 601. Hereinafter, detailed processes performed by the chromatic color determining section 605 and the achromatic color determining section 606 will be described.

The chromatic color determining section 605 determines the defined values of a chromatic color belonging to the category that is indicated by the color index set by the chromatic color label setting section 601 in the output color space. In addition, the chromatic color determining section 605 determines the defined values of a chromatic color belonging to the category that is indicated by the color index set by the chromatic color label setting section 601 in the input color space. For example, the chromatic color determining section 605 uses (0,255,255) as, the defined values of "red" in the input color space; and uses (0,255,255,0) as the defined values of "red" in the output color space in the case in which the chromatic color belonging to the category that is indicated by the color index set by the chromatic color label setting section 601 is "red".

In addition, the chromatic color determining section 605 decreases the determined defined value of the chromatic color in the output color space such that the total amount of the defined values of chromatic colors in the output color space does not exceed the total amount regulating value that is set by the total amount regulation setting section 603. For example, the chromatic color determining section 605, in a two-color printing process for printing the output image data including "red" and "black", in the case in which the total amount regulating value set by the total amount regulation setting section 603 is "180%," when "red" that represents defined values (0,255,255,0) is used, the total amount of the defined values of "red" becomes "200%," which exceeds the total amount regulating value. Accordingly, the chromatic color determining section 605 decreases the defined values to be defined values of (0,229,229,0) of "red" by applying "0.9" to the defined values of (0,255,255,0) of "red," so that the total amount of defined values of "red" become 180%. In addition, as long as the coloring materials having the same degree of coloring are used, decreasing of the total amount leads to a decrease in the saturation of the chromatic color. Thus, the color tone of the achromatic color is adjusted in combination with the decrease in the saturation of the chromatic color.

The achromatic color determining section 606 determines defined values of an achromatic color belonging to the category that is indicated by the color index set by the achromatic color label setting section 602 in the output color space. In addition, the achromatic color determining section 606 determines defined values of an achromatic color belonging to the category that is indicated by the color index set by the achromatic color label setting section 602 in the input color space.

Then, the achromatic color determining section 606 calculates the hue of the chromatic color belonging to the category that is indicated by the color index set by the chromatic color label setting section 601 in the output color spate from the defined values of the chromatic colors determined by the chromatic color determining section 605 in the output color space. Next, the achromatic color determining section 606 changes the defined values of the determined achromatic color in the output color space in accordance with the calculated hue, thereby adjusting the color tone of the achromatic color belonging to the category that is indicated by the color index set by the achromatic color label setting section 602. The color tone is the tone of a color that can be classified based on the brightness and the hue of the color.

In this embodiment, the achromatic color determining section 606 calculates the hue of the chromatic color belonging to the category that is indicated by the color index that is set by the chromatic color label setting section 601 in the output color space from the defined values of the chromatic color determined by the chromatic color determining section 605. Next, the achromatic color determining section 606 determines the direction of the hue for increasing the saturation of the achromatic color belonging to the category denoted by the color index that is set by the achromatic color label setting section 602 in accordance with the calculated hue. More specifically, the achromatic color determining section 606 determines the direction of the calculated hue as the direction of the hue for increasing the saturation of the achromatic color in the case in which the uniformity enhancement mode is set and determines the direction of the complementary color of the calculated hue as the direction for increasing the saturation of the achromatic color in the case in which the contrast enhancement mode is set. Then, the achromatic color determining section 606 adjusts the color tone of the achromatic color belonging to the category that is indicated by the color index that is set by the achromatic color label setting section 602 by increasing the saturation in the determined direction of the hue. In other words, the achromatic color determining section 606 changes the method of adjusting the color tone of the achromatic color in accordance with the set mode. The method of adjusting the color tone of the achromatic color in accordance with the mode will be described later in detail.

For example, in the case in which the defined values of the chromatic color determined by the chromatic color determining section 605 are (0,255,255,0) in the output color space (in other words, the color belonging to the category indicated by the color index that is set by the chromatic color label setting section 601 is "red"), the achromatic color determining section 606 adjusts the color tone of the achromatic color by increasing the saturation in the direction of "cyan" (defined values of the chromatic color are (255,0,0,0)), which is the complementary color of "red" or the saturation in the direction of "magenta" and "yellow" (defined values of the chromatic color are (0,255,255,0)). In other words, the achromatic color of which the color tone is adjusted by the achromatic color determining section 606 has a colder tone by adding "cyan" thereto or has a warmer tone by adding "magenta" and "yellow" thereto. Accordingly, the color relation between the chromatic color and the achromatic color can be adjusted, and whereby the color contrast or the uniformity can be applied to the entire image data. In addition, since the relation between the chromatic color and the achromatic color in the color distance can be adjusted, the amount of the color contrast or the uniformity of the entire image data can be adjusted.

In addition, in the case in which the uniformity enhancement mode is set in which the color tone of the entire image data is uniformized by the coloring material reduction setting section 604, the achromatic color determining section 606 adjusts the color tone of the achromatic color included in the image data by increasing the saturation of the achromatic color (for example, "black") belonging to the category indicated by the color index that is set by the achromatic color label setting section 602 so as to approach in the direction of the hue of the chromatic color (for example, "red") belonging to the category that is indicated by the color index that is set by the chromatic color label setting section 601. More specifically, the achromatic color determining section 606 changes the defined values (0,0,0,255) of "black" to (0,$\Delta$M,$\Delta$Y,255). Accordingly, the saturation of "black" included in the image data increases in the direction of "red" included in the image data, and thereby the color tone of the achromatic color becomes a warmer tone. In other words, the achromatic color determining section 606 adjusts the color tone of the achromatic color included in the image data so as to decrease a color difference except for the luminance from the chromatic color belonging to the category indicated by the color index that is set by the chromatic color label setting section 601.

In addition, in the case in which the contrast enhancement mode is set in which the contrast of the entire image data is increased by the coloring material reduction setting section 604, the achromatic color determining section 606 adjusts the color tone of the achromatic color included in the image data by increasing the saturation of the achromatic color (for example, "black") belonging to the category indicated by the color index that is set by the achromatic color label setting section 602 so as to approach the saturation in the direction of the complementary color (cyan) of the hue of the chromatic color (for example, "red") belonging to the category that is indicated by the color index that is set by the chromatic color label setting section 601. More specifically, the achromatic color determining section 606 changes the defined values (0,0,0,255) of "black" to ($\Delta$C,0,0,255). Accordingly, the saturation of "black" included in the image data increases in the direction of the complementary color of "red" included in the image data, and thereby the color tone of the achromatic color becomes a colder tone. Here, the change amounts $\Delta$C, $\Delta$M, and $\Delta$Y that change the defined values of the achromatic color are determined in accordance with a color difference $\Delta$E calculated from the defined values of the chromatic color in the input color space that is determined by the chromatic color determining section 605 and the defined values of the chromatic color in the output color space.

More specifically, the achromatic color determining section 606, first, as described above, calculates the hues of the chromatic colors (the chromatic colors included in the output image data) belonging to the category that is indicated by the color index that is set by the chromatic color label setting section 601 from the defined values of the chromatic colors in the output color space that are determined by the chromatic color determining section 605. In addition, the achromatic color determining section 606 can determine a desired hue having the direction in which the saturation of the achromatic color included in the image data is preferably to be increased based on whether the contrast enhancement mode or the uniformity enhancement mode is set by the coloring material reduction setting section 604. Accordingly, which of the change amounts $\Delta$C, $\Delta$M, and $\Delta$Y that change the defined values of the achromatic color is desired to be increased can be determined.

In the case in which the contrast enhancement mode is set by the coloring material reduction setting section 604, the achromatic color determining section 606, in order to maintain the color difference between the achromatic color and the chromatic color in the input color space, adjusts the color tone of the achromatic color included in the image data by determining the change amounts $\Delta$C, $\Delta$M, and $\Delta$Y such that the Lab value of the achromatic color is close to the color difference $\Delta$E in the output color space, using a configuration in which the Lab value is calculated from the defined values of the colors in the output color space. Accordingly, the color tone of the achromatic color included in the image data can be adjusted while a color difference between the chromatic color and the achromatic color is maintained in a device-independent color space (the input color space) that does not depend on the device of the output destination of the image data, and thereby the color relation between the chromatic color and the achromatic color can be represented without depending on the device of the output destination. In addition, the Lab value corresponding to the defined values of the color in the output color space (the CMYK color space) may be acquired through experiments in advance and stored in the inside of the MFP 100 (the memory 107 or the like), or the Lab value may be dynamically acquired by interpolation calculation or by allowing a neural network or the like to learn about the Lab value corresponding to the defined values of the color in the output color space. In addition, although the Lab value corresponding to the defined values of the color in the input color space (the RGB color space) may be acquired as above, in the case in which a standard RGB color space (for example, sRGB) is employed as the input color space, the Lab value may be calculated by using an existing conversion equation.

Here, a method of adjusting the color tone of an achromatic color in the output color space in the case in which the chromatic color belonging to the category that is indicated by the color index that is set by the chromatic color label setting section 601 is "red," and a color difference $\Delta$E acquired from the defined values of "red (the chromatic color represented in the RGB color space)" in the input color space and defined values of "black (the achromatic color represented in the RGB color space)" in the input color space is "10."

The achromatic color determining section 606, in the case in which the contrast enhancement mode is set by the coloring material reduction setting section 604, allows a Lab value corresponding to the defined values of the achromatic color in the output color space to approach the color difference $\Delta$E of "10" by determining the change amount $\Delta$C of the defined values ($\Delta$C,0,0,255) of the achromatic color such that the saturation of "black" increases in the direction of the complementary color of "red." However, since the change amounts $\Delta$C, $\Delta$M, and $\Delta$Y are not always determined at once, determination on $\Delta$C, $\Delta$M, and $\Delta$Y is repeatedly performed in the case in which a difference between the Lab value corresponding to the defined values of the achromatic color in the output color space and the color difference $\Delta$E is large. Accordingly, a color difference between the chromatic color and the achromatic color in the RGB color space that is the input color space is thus maintained as a color difference between the chromatic color and the achromatic color in the CMYK color space that is the output color space.

On the other hand, the achromatic color determining section 606, in the case in which the uniformity enhancement mode is set by the coloring material reduction setting section 604, allows a Lab value corresponding to the defined values of the achromatic color in the output color space to approach a Lab value corresponding to the defined values of the chromatic color in the output color space by determining the change amounts ΔM and ΔC of the defined values (0,ΔM,ΔC, 255) of the achromatic color such that the saturation of the achromatic color increases in the direction of "red." However, in the case in which the Lab value corresponding to the defined values of the achromatic color is equal to the Lab value corresponding to the defined values of the chromatic color, the achromatic color becomes the chromatic color. Accordingly, the values of ΔM and ΔC are decreased by applying an appropriate adjustment ratio R to ΔM and ΔC. For example, the adjustment ratio R is "0.1."

Figure 7:
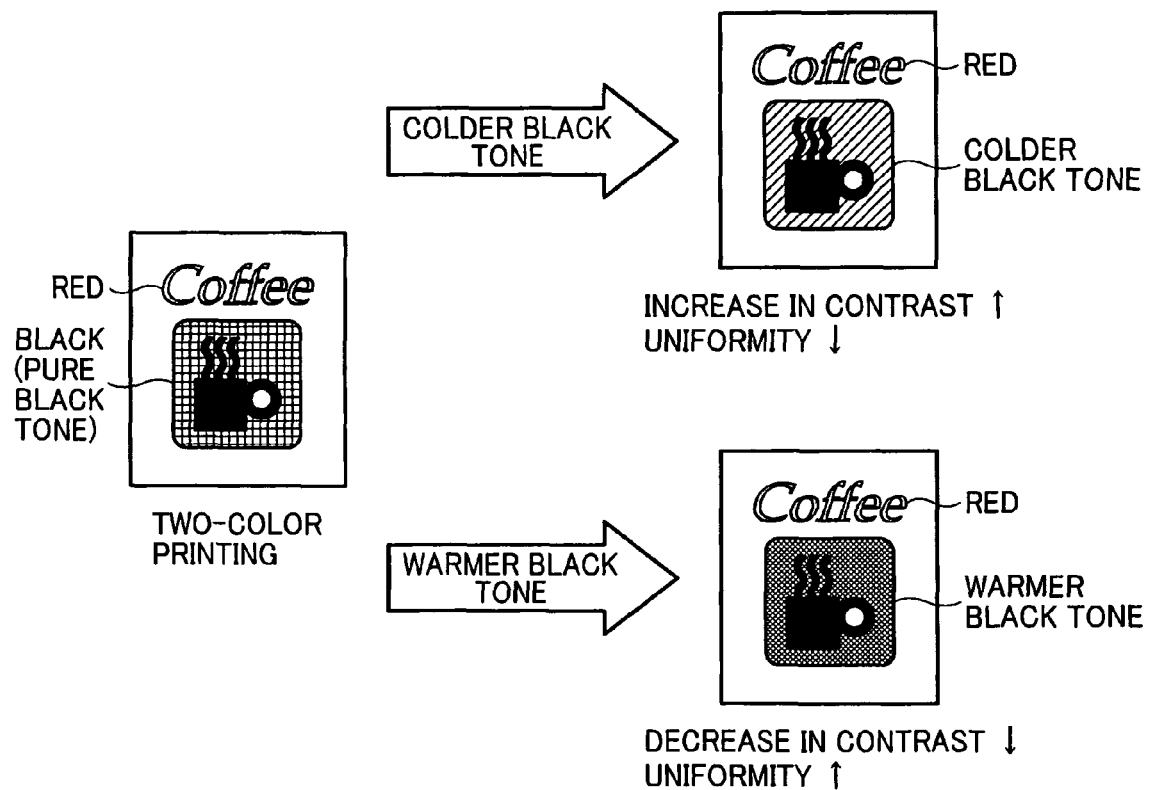
FIG. 7 is a schematic diagram illustrating an example of enhancement in color contrast or uniformity in the case in which two-color printing of "red" and "black" is performed.
Figure 8A:
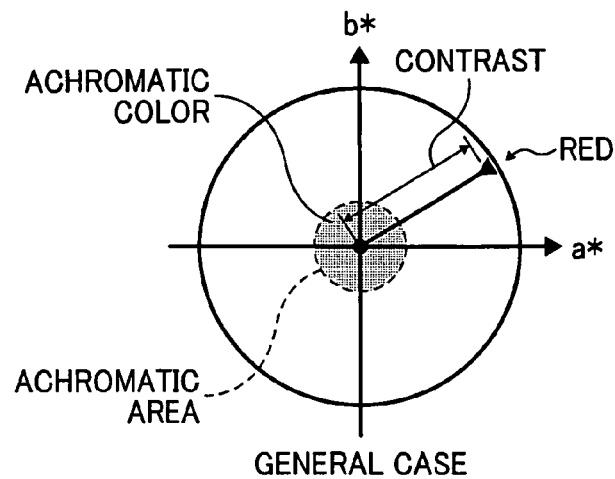
FIGS. 8A to 8C are chromaticity diagrams of output image data with enhanced color contrast and improved uniformity in the case in which two-color printing of "red" and "black" is performed.
Figure 8B:
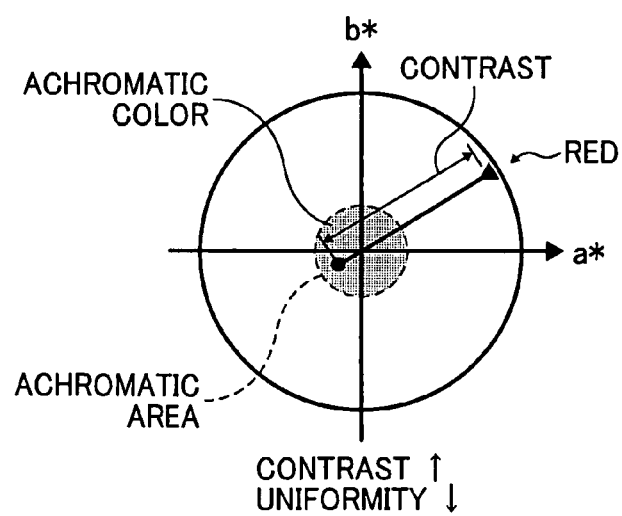
Figure 8C:
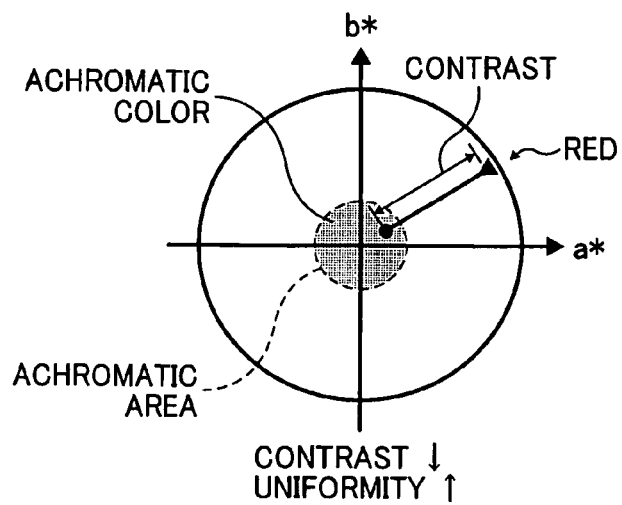

An example of enhancement in the color contrast or the uniformity in the case in which two-color printing of "red" and "black" is performed will be described with reference to FIGS. 7 and 8A to 8C. FIG. 7 is a schematic diagram illustrating an example of enhancement in the color contrast or the uniformity in the case in which two-color printing of "red" and "black" is performed. FIGS. 8A to 8C are chromaticity diagrams of output image data of which the color contrast or the uniformity is enhanced in the case in which two-color printing of "red" and "black" is performed.

In the case in which the chromatic color included in the output image data is determined to be "red" in a two-color printing process or the like, when the achromatic color determining section 606 increases the saturation of the achromatic color included in the output image data in the direction (reverse hue of the hue of the chromatic color) of the complementary color of "red" such that a coloring material other than "black" (a coloring material of a chromatic color) is mixed into the coloring material of "black" as an achromatic color, the color tone of "black" becomes a colder tone (shown in FIG. 7). Accordingly, compared to a difference (shown in FIG. 8A) in the chromaticity between the achromatic color included in the ordinary output image data and "red", a difference (shown in FIG. 8B) in the chromaticity between the achromatic color included in the output image data of which the color tone of the achromatic color is adjusted and "red" is increased, whereby the color contrast can be improved.

In contrast, when the achromatic color determining section 606 increases the saturation of the achromatic color included in the output image data in the direction of "red" such that a coloring material other than "black" (a coloring material of a chromatic color) is mixed into the coloring material of "black" as an achromatic color, the color tone of "black" becomes a warmer tone (shown in FIG. 7). Accordingly, compared to a difference (shown in FIG. 8A) in the chromaticity between the achromatic color included in the ordinary output image data and "red", a difference (shown in FIG. 8C) in the chromaticity between the achromatic color included in the output image data of which the color tone of the achromatic color is adjusted and "red" is decreased, whereby the color uniformity can be improved.

In ordinary two-color printing using "red" and "black", only the coloring material of "magenta" and the coloring material of "yellow" are used in the case in which "red" as a chromatic color is reproduced. On the other hand, only the coloring material of "black" is used in the case in which "black" as an achromatic color is reproduced.

In contrast to this, in the MFP 100 according to this embodiment, in the case in which "black" as an achromatic color is reproduced, by using a coloring material acquired by adding the coloring material of "cyan," which is the complementary color of "red", to the coloring material of "black" as an achromatic color, the color tone of "black" becomes a colder tone. As a result, while the color uniformity between "red" as a chromatic color and "black" as an achromatic color is decreased, the color contrast is improved. In addition, in the MFP 100 according to this embodiment, in the case in which "black" as an achromatic color is reproduced, by using a coloring material acquired by adding the coloring material of "magenta" and the coloring material of "yellow" to the coloring material of "black" as an achromatic color, the color tone of "black" becomes a warmer tone. As a result, while the color contrast between "red" as a chromatic color and "black" as an achromatic color is decreased, the color uniformity is improved.

Figure 9:
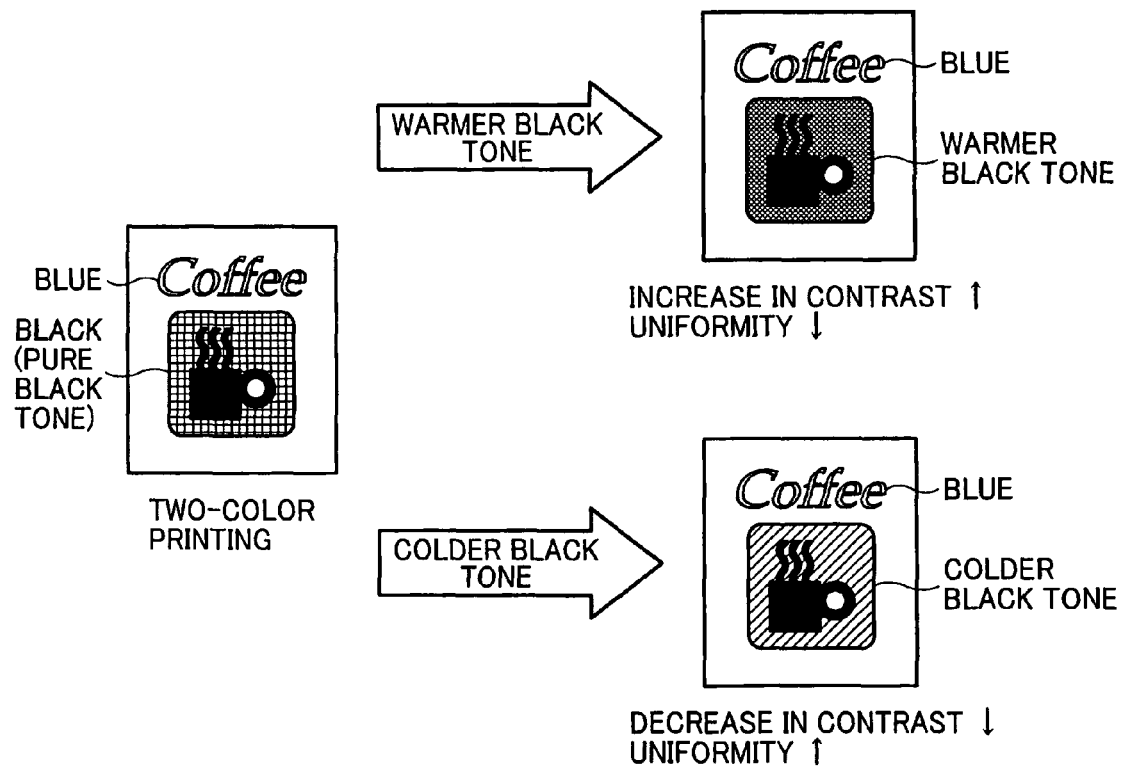
FIG. 9 is a schematic diagram illustrating an example of enhancement in color contrast and improvement in uniformity in the case in which two-color printing of "blue" and "black" is performed.
Figure 10A:
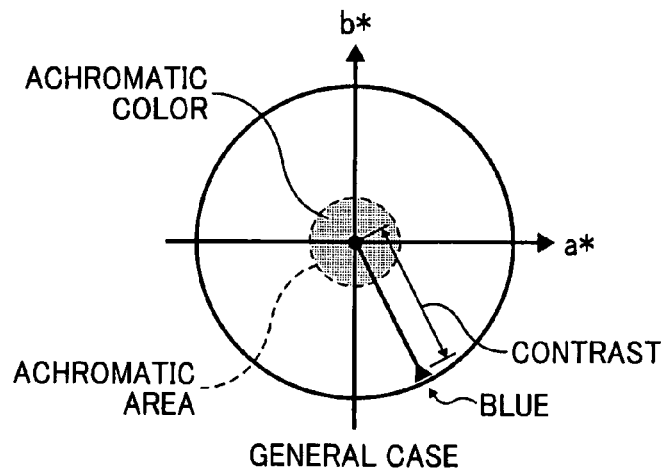
FIGS. 10A to 10C are chromaticity diagrams of, output image data with enhanced color contrast and improved uniformity in the case in which two-color printing of "blue" and "black" is performed.
Figure 10B:
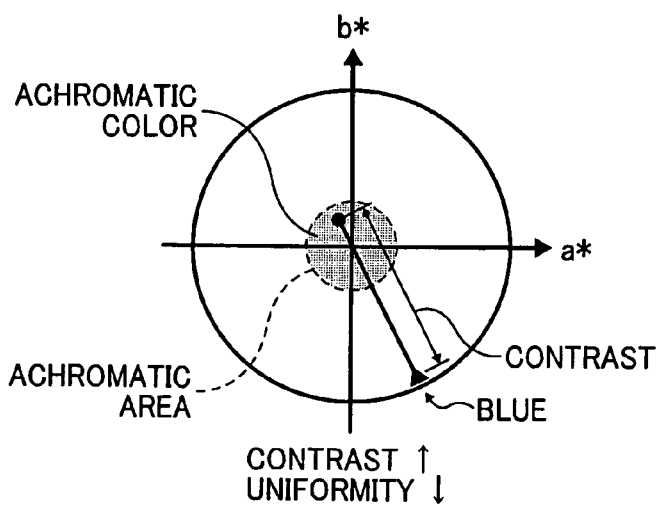
Figure 10C:
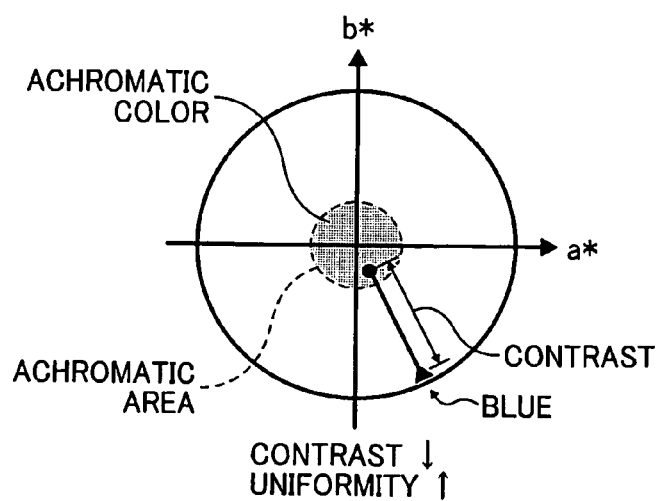

An example of enhancement in the color contrast or the uniformity in the case in which two-color printing of "blue" and "black" is performed will be described with reference to FIGS. 9 and 10A to 10C. FIG. 9 is a schematic diagram illustrating an example of enhancement in the color contrast or the uniformity in the case in which two-color printing of "blue" and "black" is performed. FIGS. 10A to 10C are chromaticity diagrams of output image data in which the color contrast or the uniformity is enhanced in the case in which two-color printing of "blue" and "black" is performed.

In the case in which the chromatic color included in the output image data is determined to be "blue" in a two-color printing process or the like, when the achromatic color determining section 606 increases the saturation of the achromatic color included in the output image data in the direction of the complementary color of "blue" such that a coloring material other than "blue" ("yellow") is mixed into the coloring material of "black" as an achromatic color, the color tone of "black" becomes a warmer tone (shown in FIG. 9). Accordingly, compared to a difference (shown in FIG. 10A) in the chromaticity between the achromatic color included in the ordinary output image data and "blue," a difference (shown in FIG. 10B) in the chromaticity between the achromatic color included in the output image data of which the color tone of the achromatic color is adjusted and "blue" is increased, whereby the uniformity is decreased, and the color contrast can be improved.

In contrast, when the achromatic color determining section 606 increases the saturation of the achromatic color included in the output image data in the direction of "blue" such that a coloring material other than "black" ("magenta" and "cyan") is mixed into the coloring material of "black" as an achromatic color, the color tone of "black" becomes a colder tone (shown in FIG. 9). Accordingly, compared to a difference (shown in FIG. 10A) in the chromaticity between the achromatic color included in the ordinary output image data and "blue," a difference (shown in FIG. 10C) in the chromaticity between the achromatic color included in the output image data of which the color tone of the achromatic color is adjusted and "blue" is decreased, whereby the color contrast is decreased, and the color uniformity can be improved.

Referring back to FIG. 6, as long as coloring materials having the same degree of coloring are used, decreasing of the total amount of defined values of the chromatic color included in the output image data leads to a decrease in the saturation of the chromatic color, and accordingly, similarly to the chromatic color determining section 605, the achromatic color determining section 606 decreases the defined values of the achromatic color in the determined output color space such that the total amount of the defined values of the achromatic color in the output color space does not exceed the total amount regulating value that is set by the total amount regulation setting section 603. Commonly, when the total amount of the defined values of the chromatic color is regulated, the color tone of the chromatic color is changed in the direction in which the saturation of the chromatic color is decreased. Accordingly, in the case in which the uniformity enhancement mode is set, the achromatic color determining section 606 decreases the degree of approach to the color tone of the achromatic color that is adjusted by the chromatic color determining section 605. On the other hand, in the case in which the contrast enhancement mode is set, the achromatic color determining section 606 increases the degree of detachment in the direction of the complementary color of the color tone of the chromatic color that is adjusted by the chromatic color determining section 605.

More specifically, as described above, when adjusting the color tone of the achromatic color in the output color space in accordance with the hue calculated from the defined values of the chromatic color in the output color space that is determined by the chromatic color determining section 605, the achromatic color determining section 606 adjusts the color tone of the achromatic color by adding the change amounts ΔC, ΔM, and ΔY to the defined values of the determined achromatic color in the output color space. The color tone of the achromatic color is adjusted by adding the change amounts ΔC, ΔM, and ΔY to the defined values of the achromatic color within the range in which the total amount of the defined values of the achromatic color after adjustment of the color tone does not exceed the total amount regulating value. When the color tone of the achromatic color needs to be adjusted beyond the total amount regulating value, the achromatic color determining section 606 decreases the value of K out of the defined values of the determined achromatic color in the output color space, so that the total amount of the defined values of the achromatic color does not exceed the total amount regulating value. However, in the case where the value of K is decreased, the coloring material of black as an achromatic color is decreased in accordance with the total amount regulating value, and accordingly, the brightness of the output image data is increased, thereby the representation of the achromatic color of the output image data is deviated from the original brightness. In contrast, in a mode in which the output mode that is set by the coloring material reduction setting section 604 is a mode in which the brightness of the achromatic color (black) is not desired to be increased, the achromatic color determining section 606 needs to decrease the change amounts ΔC, ΔM, and ΔY to be added to the defined values of the achromatic color, and thereby there is limitation on the adjustment of the color tone of the achromatic color.

For example, the achromatic color determining section 606 adjusts the color tone of the achromatic color included in the output image data by changing the defined values of the determined achromatic color in the output color space so as not to decrease the amount of the coloring material of the achromatic color until the total amount of the defined values of the achromatic color does not exceed the total amount regulating value. When the total amount of the defined values of the achromatic color exceeds the total amount regulating value, the achromatic color determining section 606 adjusts the color tone of the achromatic color included in the output image data by changing the defined values of the determined achromatic color in the output color space so as to decrease the amount of the coloring material of the achromatic color. Accordingly, the color tone of the achromatic color can be adjusted while the brightness of the achromatic color is maintained as much as possible, without exceeding the total amount regulating value.

In addition, in the case in which the toner save mode or the ink save mode is set by the coloring material reduction setting section 604, generally, the amount of the coloring material that can be used for the chromatic color is decreased so as to decrease the saturation. Accordingly, the achromatic color determining section 606 adjusts the color tone of the achromatic color included in the output image data by changing the defined values of the achromatic color in the output color space such that the amount of the coloring material used for output of the achromatic color is equal to or less than a predetermined amount. As above, in the case in which the toner save mode or the ink save mode is set, the amount of the coloring material used for the achromatic color is also decreased. Thus, the achromatic color determining section 606 changes the defined values of the achromatic color in a state in which the brightness thereof is increased in consideration of such a factor. In addition, in the case in which the toner save mode or the ink save mode is set, the achromatic color determining section 606 needs to change K included in the defined values of the achromatic color in combination with the added change amounts ΔC, ΔM, and ΔY.

For example, in two-color printing of "red" and "black", in the case in which the toner save mode or the ink save mode is set by the coloring material reduction setting section 604, the color tone of the achromatic color included in the output image data is adjusted by changing the defined values of the corresponding "black" with the defined values (0,0,0,127) of "black" used as a reference such that the amount of the used coloring material is equal to or less than the amount acquired by decreasing the amount of the coloring material used for the output of "black" represented by the defined values (0,0,0,255) of "black" by 50%. The achromatic color determining section 606 adjusts the color tone to "black" that is represented by the defined values (0,16,16,112) of "black" in the case in which the color tone is uniformized, and adjusts the color tone to "black" that is represented by the defined values (32,0,0,112) of "black" in the case in which the contrast is increased. Accordingly, even when the color tone of the achromatic color is changed by adding a coloring material other than the coloring material of the achromatic color, the total amount of the coloring material that is used for the output of the chromatic color is not changed. Therefore, the color tone of the achromatic color can be adjusted while decreasing the use amount of the coloring material.

Figure 11:
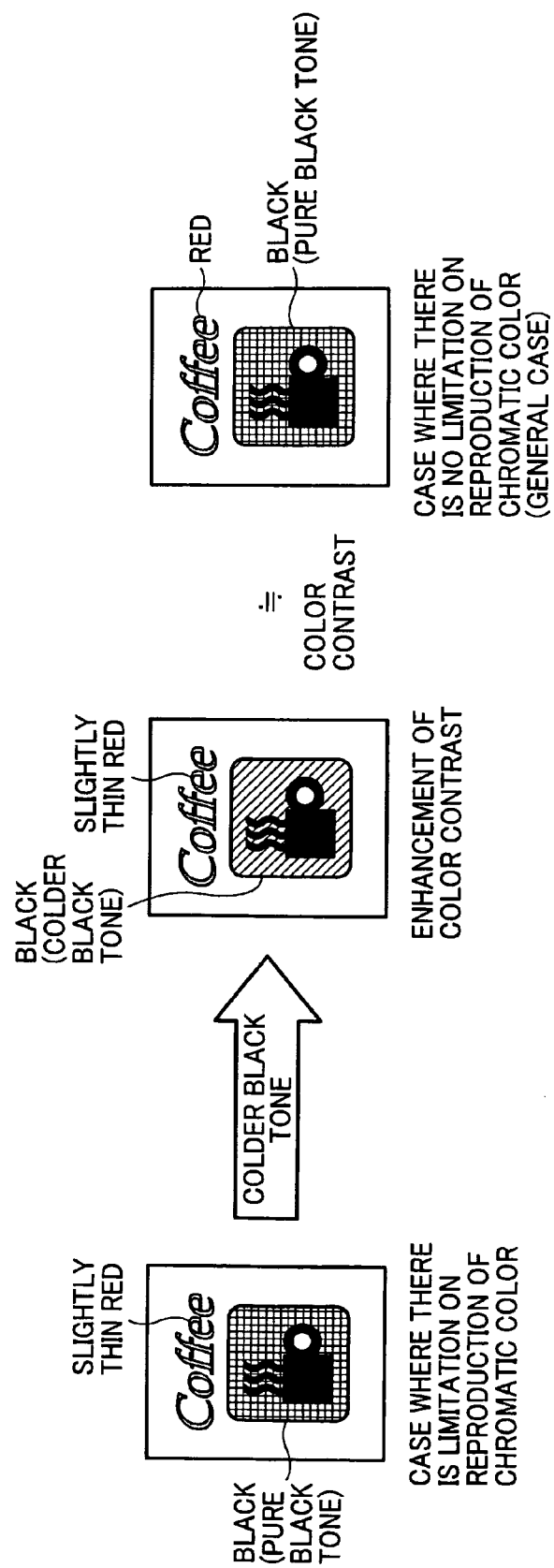
FIG. 11 is a schematic diagram illustrating an example of enhancement in color contrast in the case in which there is limitation on the reproduction of a chromatic color.
Figure 12A:
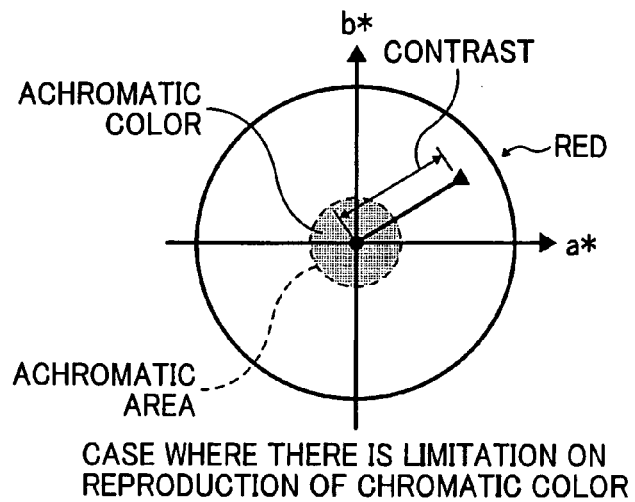
FIGS. 12A to 12C are chromaticity diagrams of output image data with enhanced color contrast in the case in which there is limitation on the reproduction of the chromatic color.
Figure 12B:
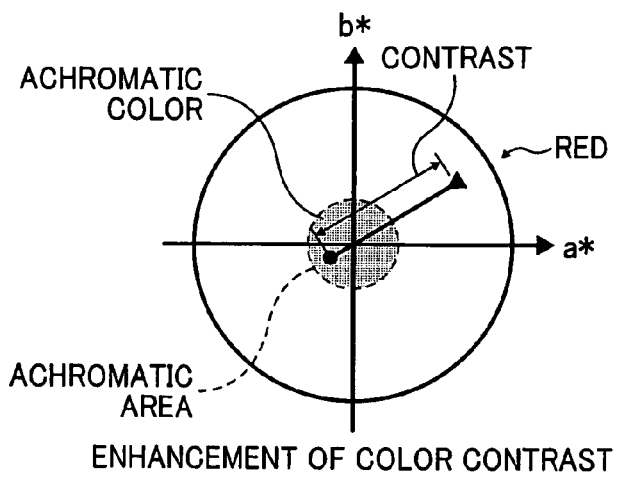
Figure 12C:
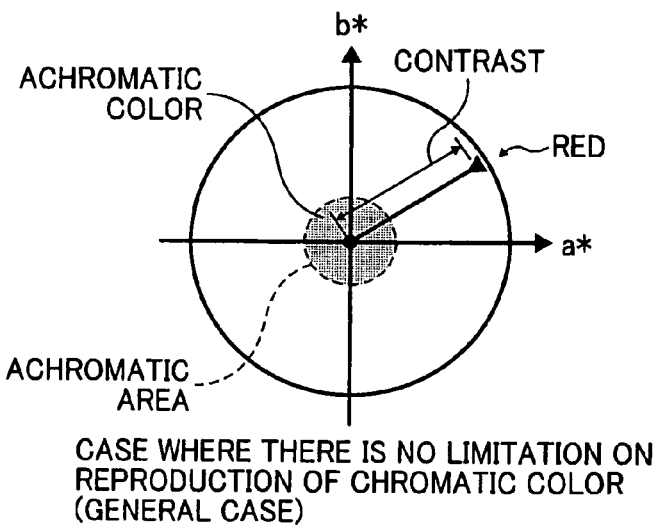

An example of enhancement in the color contrast in the case in which there is restriction on the reproduction of a chromatic color in accordance with the toner save mode, the total amount regulating value, or the like will be described with reference to FIGS. 11, and 12A to 12C. FIG. 11 is a schematic diagram illustrating an example of enhancement in the color contrast in the case in which there is restriction on the reproduction of the chromatic color. FIGS. 12A to 12C are chromaticity diagrams of output image data of which the color contrast is enhanced in the case in which there is restriction on the reproduction of the chromatic color.

In the case in which there is restriction on the reproduction of the chromatic color (for example, a case where the degree of coloring of the coloring material such as toner or ink is low, a case where the total amount regulating value or the toner save mode is set, or the like) in a two-color printing process or the like, the saturation of the chromatic color is consequently decreased, and accordingly, the color contrast of the chromatic color and the achromatic color is decreased from the assumed color contrast (as shown in FIGS. 11 and 12A).

In contrast to this, in the MFP 100 according to this embodiment, in the case in which there is restriction on the reproduction of the chromatic color, the achromatic color determining section 606 adjusts the color tone of the achromatic color included in the output image data, so that the color tone of "black" becomes a colder tone by increasing the saturation in the direction in the complementary color of "red" as a chromatic color so as to mix a coloring material (the coloring material of "cyan") of a color other than "black" into the coloring material of "black" as an achromatic color (shown in FIG. 11). Accordingly, even in the case in which there is restriction on the reproduction of the chromatic color, a difference in the chromaticity between the achromatic color included in the output image data and "red" can be maintained (shown in FIG. 12B), and accordingly, a decrease in the color contrast can be prevented.

In addition, in the case in which there is no restriction on the reproduction of the chromatic color, color contrast between "red" and the achromatic color does not decrease (shown in FIGS. 11 and 12C), and accordingly, the color tone of the achromatic color does not need to be adjusted.

In this embodiment, the color tone of the achromatic color included in the output image data is adjusted based on the defined values of the colors in the CMYK color space. However, the color tone of the achromatic color of the output image data may be adjusted by increasing the saturation of the achromatic color of the output image data based on the defined values of the colors in an HSL color space or a Lab color space that is intuitively understandable.

In addition, in the case in which a plurality of chromatic colors belongs to the category that is indicated by the color indices that is set by the chromatic color label setting section 601 (that is, not two-color printing but full-color printing is performed), the achromatic color determining section 606 calculates an average of the saturation in the direction of the complementary colors of the plurality of chromatic colors belonging to the category indicated by a plurality of set color indices and adjusts the color tone of the achromatic color belonging to the category indicated by the color indices that is set by the achromatic color label setting section 602 by increasing the saturation by the calculated average. In other words, chromatic colors indicated by two chromatic color labels set by the chromatic color label setting section 601 are in the relation of complementary colors and have the same saturation, adjustment of the color tone of the achromatic color using the achromatic color determining section 606 cannot be performed. However, in the case in which the areas in the output image data that are occupied by the chromatic colors of the two chromatic color labels are different from each other, the amount of adjustment of the color tone of the achromatic color that is determined by the achromatic color determining section 606 may be changed in accordance with the size of the area. More specifically, since a chromatic color occupying a larger area in the output image data has higher influence on the color tone of the achromatic color, the adjustment of the color tone of the achromatic color is weighted in accordance with the ratio of the areas occupied by the chromatic colors in the output image data.

The color determining section 607 determines whether or not a color included in the input image data (the digital image data of RGB each having 8 bits) belongs to one of six hues RGBCMY.

The color converting section 608, in parallel with determination on the hue that is performed by the color determining section 607, represents colors included in the input image data and the output image data as vectors for each hue of the input image data and transforms the color space by using a masking operation. In addition, the color converting section 608, in the case in which a two-color printing process for outputting image data including an achromatic color and at least one chromatic color is performed, generates image data including a chromatic color (or a chromatic color of which the color tone is adjusted by the chromatic color determining section 605) belonging to the category indicated by the color index that is set by the chromatic color label setting section 601 and an achromatic color of which the color tone is adjusted by the achromatic color determining section 606.

Figure 13:
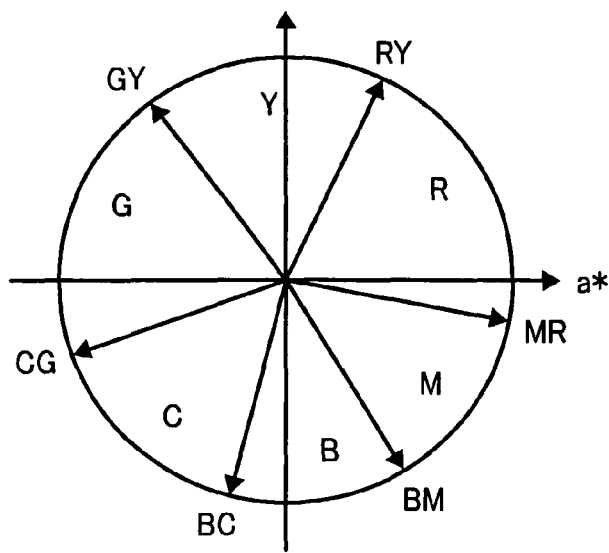
FIG. 13 is a conceptual diagram of a hue division-type color conversion.
Figure 14:
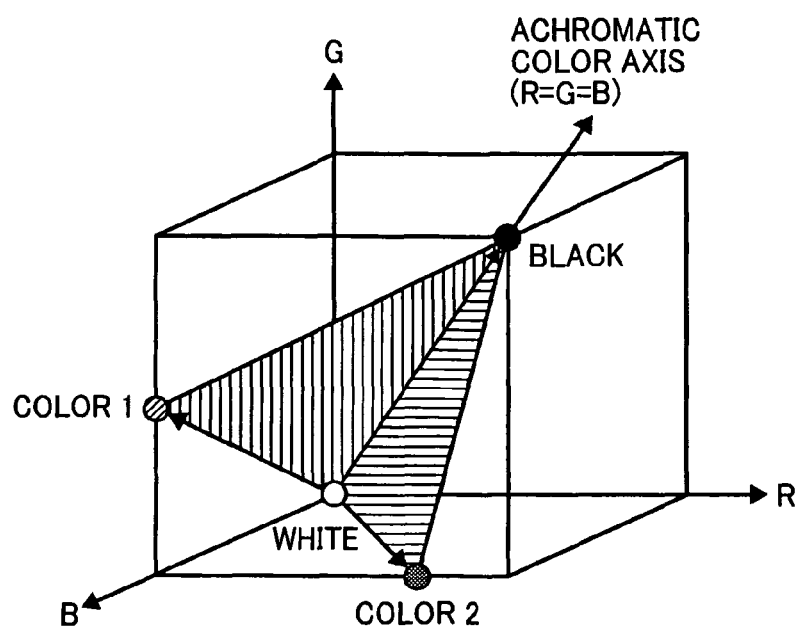
FIG. 14 is a conceptual diagram of a hue division-type color conversion.
Figures 15, 16:
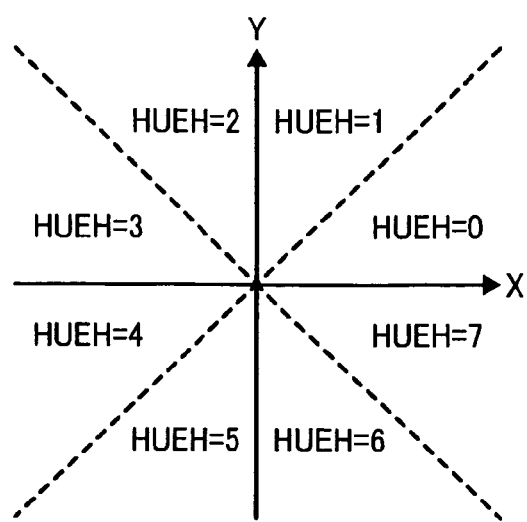
FIG. 15 is a diagram representing a calculation equation of masking coefficients.
FIG. 16 is a conceptual diagram of a wide area hue signal.

A method of transforming the color space of the input image data through a masking operation will be described in detail with reference to FIGS. 13 to 15. FIGS. 13 and 14 are conceptual diagrams of hue division-type color conversion. FIG. 15 is a diagram representing a calculation equation of masking coefficients.

The color converting section 608 divides the input image data for each hue, represents colors included in the input image data and the output image data with two vectors (shown in FIG. 13) representing the boundaries of hues and white and black vectors (shown in FIG. 14) for each divided hue, and transforms a color space through a masking operation.

For example, the colors of the input image data and the output image data of the R hue are represented by a total of four vectors acquired by adding the white and black vectors to vectors RY and MR representing the boundary of the R hue. Since the vectors representing the boundary of the hue are converted by the color space of the input image data, the vectors can be changed by parameters or the like.

Here, when two vectors (R1,G1,B1) and (R2,G2,B2) of white and black colors and two vectors (R3,G3,B3) and (R4, G4,B4) representing the boundaries of hues are assumed to be defined values of colors included in the input image data, and defined values of colors included in the output image data corresponding to the input image data are assumed to be (C1,M1,Y1,K1), (C2,M2,Y2,K2), (C3,M3,Y3,K3), and (C4, M4,Y4,K4); the color converting section 608 calculates masking coefficients for each hue by using an equation represented in FIG. 15. In addition, in order to form a matrix representing the defined values of colors included in the input image data as a square matrix, "1" is added to each vector configuring the defined values of the colors included in the input image data. When the masking coefficients for each hue are calculated, the color converting section 608 performs a masking operation using the calculated masking coefficients so as thereby to transform the color space. In addition, the result of calculation of each hue that is performed by the color converting section 608 is selected by a selector 609.

Next, a method of dividing the input image data for each hue will be described in detail with reference to FIG. 16. FIG. 16 is a conceptual diagram of a wide area hue signal.

The color converting section 608, first, generates color difference signals X and y from the input image data using Equations 1 and 2. Here, when X is equal to or greater than zero, defined is X=X/2.

$$X = G - R \tag{1}$$

$$Y = B - G \tag{2}$$

Next, the color converting unit 608 generates wide area hue signals HUEH from the color difference signals X and Y. The wide area hue signals. HUEH are signals that divide the X-Y plane represented by the color difference signals X and Y into 8 parts (shown in FIG. 16). The wide area hue signals HUEH are sequentially calculated by using Conditional Equations 1 to 9 represented below.

!HT1 AND HT0 ... HUEH=0        Conditional Equation 1

!HT2 AND HT1 ... HUEH=1        Conditional Equation 2

!HT3 AND HT2 ... HUEH=2   Conditional Equation 3

!HT4 AND HT3 ... HUEH=3   Conditional Equation 4

!HT5 AND HT4 ... HUEH=4   Conditional Equation 5

!HT6 AND HT5 ... HUEH=5   Conditional Equation 6

!HT7 AND HT6 ... HUEH=6   Conditional Equation 7

!HT0 AND HT7 ... HUEH=7   Conditional Equation 8

OTHERS($Y=X=0$)·HUEH=7   Conditional Equation 9

Here, HT0 to HT7 are acquired as below from the color difference signals X and Y.

$HT0=(Y\geq0)$ $HT1=(Y\geq X)$ $HT2=(X\leq0)$ $HT3=(Y\leq-X)$ $HT4=(Y\leq0)$ $HT5=(Y\leq X)$ $HT6=(X\geq0)$ $HT7=(Y\geq-X)$ Next, the color converting unit 608 generates color difference signals XA and YA in accordance with the wide area hue signal HUEH. The color difference signals XA and YA are coordinates in the case in which the X-Y plane represented by the color difference signals X and Y is rotated and is moved into an area of HUEH=0.

CASE OF HUEH=0: $XA=X$ AND $YA=Y$

CASE OF HUEH=1: $XA=X+Y$ AND $YA=-X+Y$

CASE OF HUEH=2: $XA=Y$ AND $YA=-X$

CASE OF HUEH=3: $XA=-X+Y$ AND $YA=-X-Y$

CASE OF HUEH=4: $XA=-X$ AND $YA=-Y$

CASE OF HUEH=5: $XA=-X-Y$ AND $YA=X-Y$

CASE OF HUEH=6: $XA=-Y$ AND $YA=X$

CASE OF HUEH=7: $XA=X-Y$ AND $YA=X+Y$

Next, the color converting section 608 generates a narrow area hue signal HUEL from the color difference signals XA and YA. The narrow area hue signal HUEL is the slope (YA/XA) in the coordinate plane represented by the color difference signals XA and YA. Here, the resolution is configured as 32 (YA/XA=HUEL/32).

IN the CASE OF $XA=0$: HEUL=0X1F

IN the CASE WHERE $XA$ IS NOT ZERO: HEUL= $(YA<<5)/XA$

In addition, the color conversing section 608 sets a hue angle signal HUEHL([HUEH,HUEL]) by combining the wide area hue signal HUEH and a narrow area hue signal HUEL. By comparing this hue angle signal HUEHL and boundary values (HUE_R, HUE_Y, HUE_G, HUE_C, HUE_B, and HUE_M) of hues set in advance, the hue HUE is determined.

HUE_$M$<HUEHL≤HUE_$R$ ... HUE=$R$

HUE_$R$<HUEHL≤HUE_$Y$ ... HUE=$Y$

HUE_$Y$<HUEHL≤HUE_$G$ ... HUE=$G$

HUE_$G$<HUEHL≤HUE_$C$ ... HUE=$C$

HUE_$C$<HUEHL≤HUE_$B$ ... HUE=$B$

HUE_$B$<HUEHL≤HUE_$M$ ... HUE=$M$

In addition, in the case in which the color converting unit 608 generates image data including an achromatic color and at least one chromatic color from the input image data (in other words, in the case in which two-color printing is performed), two vectors representing the boundary of the hue of the chromatic color included in the output image data with defined values of the chromatic color determined by the chromatic color determining section 605; and substitutes the black vector with the defined values of the achromatic color changed by the achromatic color determining section 606. Accordingly, the color converting section 608 generates the output image data including the chromatic color belonging to the category indicated by the color index set by the chromatic color label setting section 601 and the achromatic color of which the color tone is adjusted by the achromatic color determining section 606. In addition, in the case in which the toner save mode, the ink save mode, or the total amount regulating value is set; the color converting section 608 generates image data including the chromatic color of which the color tone is adjusted by the chromatic color determining section 605 and the achromatic color of which the color tone is adjusted by the achromatic color determining section 606.

In addition, in the case in which a portion to be output in a chromatic color in a two-color printing process is all the chromatic colors of the input image data, for the output image data of all the hues; two vectors representing the boundary of the hue of the chromatic color included in the output image data are substituted with defined values of the chromatic color belonging to the category that is indicated by the color index set by the chromatic color label setting section 601 or defined values of the chromatic color of which the color tone is adjusted by the chromatic color determining section 605; and the black vector is substituted with the defined values of the achromatic color of which the color tone is adjusted by the achromatic color determining section 606. On the other hand, in the case in which a portion to be output in a chromatic color in two-color printing is only the chromatic color of a specific hue of the input image data; the above-described process is performed only for the output image data of the corresponding hue; and the vectors that define the color space of the output image data of the other hues are substituted with defined values of the achromatic color of which the color tone is adjusted by the achromatic color determining section 606.

Figure 17:
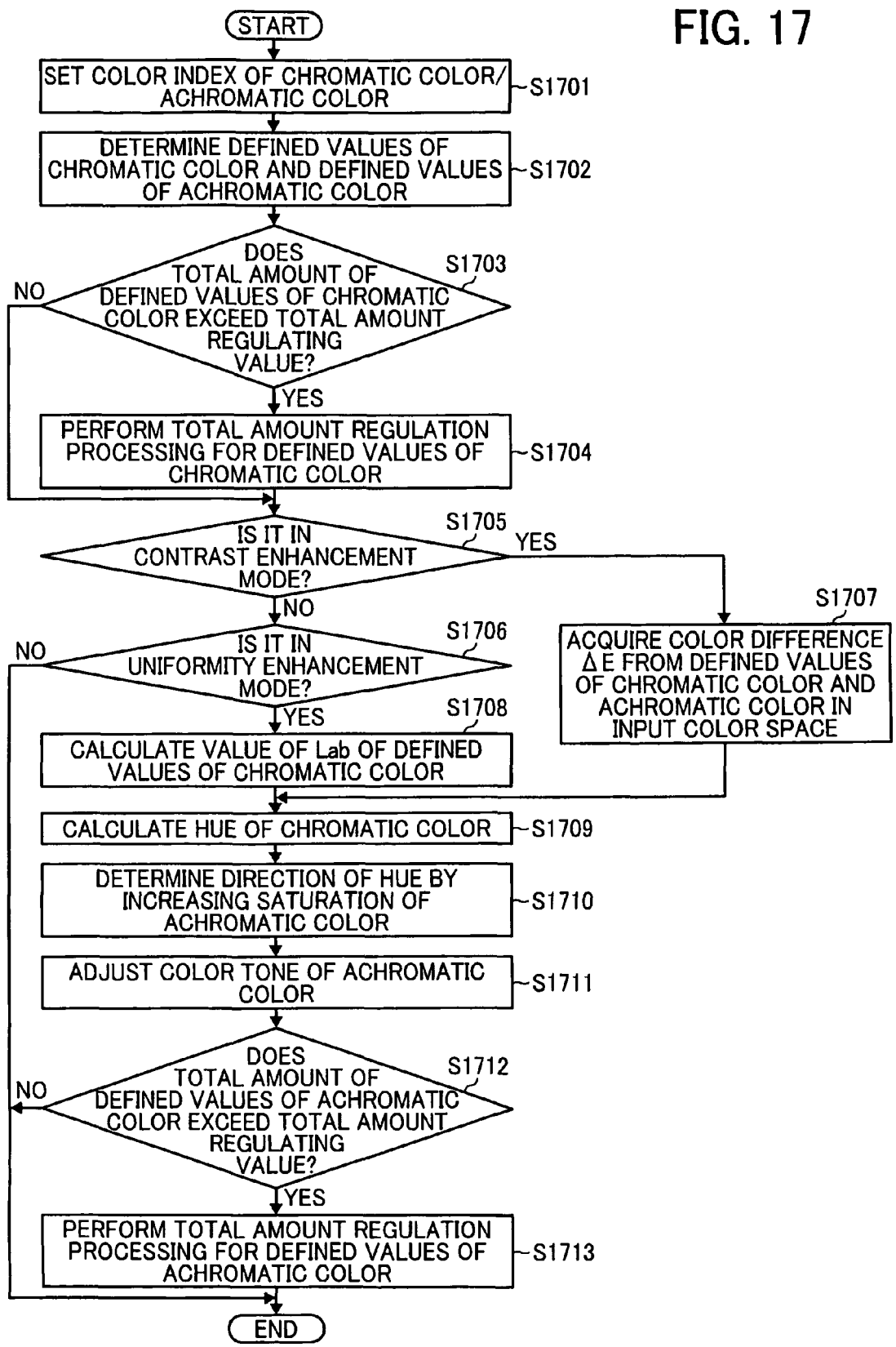
FIG. 17 is a flowchart representing the flow of an adjustment process of the color tone of the achromatic color and the color tone of the chromatic color that are included in the output image data.

Next, the flow of the process of adjusting the color tone of the achromatic color and the chromatic color that are included in the output image data will be described with reference to FIG. 17. FIG. 17 is a flowchart representing the flow of an adjustment process of the color tones of the achromatic color and the chromatic color that are included in the output image data.

First, the chromatic color label setting section 601 and the achromatic color label setting section 602 set the color indices of the chromatic color and the achromatic color (Step S1701). The chromatic color determining section 605 determines the defined values of the chromatic color belonging to the category that is indicated by the color index set by the chromatic color label setting section 601 in the input color space and the output color space; and the achromatic color determining section 606 determines the defined values of the achromatic color belonging to the category that is indicated by the color index set by the achromatic color label setting section 602 in the input color space and the output color space (Step S1702).

Next, the chromatic color determining section 605 determines whether or not the total amount of the determined defined values of the chromatic color in the output color space exceeds the total amount regulating value set by the total amount regulation setting section 603 (Step S1703). When the total amount of the determined defined values of the chromatic color in the output color space exceeds the total amount regulating value (Step S1703: Yes), the chromatic color determining section 605 performs a total amount regulating process in which the determined defined values of the chromatic color in the output color space are decreased such that the total amount of the determined defined values of the chromatic color in the output color space does not exceed the total amount regulating value (Step S1704).

When the determined defined values in the output color space are decreased, the achromatic color determining section 606 determines whether or not the contrast enhancement mode is set by the coloring material reduction setting section 604 (Step S1705). When the contrast enhancement mode is set (Step S1705: Yes), the achromatic color determining section 606 acquires a color difference ΔE between the defined values of the chromatic color in the input color space and the defined values of the achromatic color in the input color space (Step S1707). On the other hand, when the contrast enhancement mode is not set (Step. S1705: No), the achromatic color determining section 606 determines whether or not the uniformity enhancement mode is set (Step S1706). When the uniformity enhancement mode is not set (Step S1706: No), the process ends without performing adjustment of the color tone of the achromatic color included in the output image data. On the other hand, when the uniformity enhancement mode is set (Step S1706: Yes), the achromatic color determining section 606 calculates a Lab value corresponding to the defined values of the chromatic color in the output color space (Step S1708).

Next, the achromatic color determining section 606 calculates the hue of the chromatic color belonging to the category that is indicated by the color index set by the chromatic color label setting section 601 (Step S1709). In addition, the achromatic color determining section 606 determines the direction of the hue for increasing the saturation of the achromatic color belonging to the category that is indicated by the color index set by the achromatic color label setting section 602 in accordance with the contrast enhancement mode or the uniformity enhancement mode (Step S1710). For example, in the case of the contrast enhancement mode, the achromatic color determining section 606 determines the direction of the complementary color of the calculated hue of the chromatic color as the direction of the hue for increasing the saturation of the achromatic color. Accordingly, a decrease in the color contrast in printing image data including an achromatic color and at least one chromatic color can be relatively prevented; and therefore flexible representation can be made for a printed material in which the number of colors is limited. On the other hand, in the case of the uniformity enhancement mode, the achromatic color determining section 606 determines the direction of the calculated hue of the chromatic color as in direction of the hue for increasing the saturation of the achromatic color. Accordingly, the color contrast can be relatively decreased, and therefore representation having uniformity can be made for a printed material in which the number of colors is limited.

Then, the achromatic color determining section 606, in the case of the contrast enhancement mode, determines the change amounts of ΔC, ΔM, and ΔY and adjusts the color tone of the achromatic color included in the output image data such that a Lab value corresponding to the defined values of the achromatic color in the output color space is close to the color difference ΔE (Step S1711). On the other hand, the achromatic color determining section 606, in the case of the uniformity enhancement mode, determines the change amounts of ΔC, ΔM, and ΔY and adjusts the color tone of the achromatic color such that a Lab value corresponding to the defined values of the achromatic color in the output color space is close to a Lab value corresponding to the defined values of the chromatic color in the output color space (Step S1711).

Finally, the achromatic color determining section 606 determines whether or not the total amount of the defined values of the achromatic color in the output color space exceeds the total amount regulating value that is set by the total amount regulation setting section 603 (Step S1712). When the total amount of the defined values of the achromatic color in the output color space exceeds the total amount regulating value (Step S1712: Yes), the achromatic color determining section 606 performs a total amount regulating process in which the color tone of the achromatic color in the output color space is adjusted such that the total amount of the defined values of the achromatic color in the output color space does not exceed the total amount regulating value (Step S1713). On the other hand, when the total amount of the defined values of the achromatic color in the output color space does not exceed the total amount regulating value (Step S1712: No), the process of adjusting the color tones of the achromatic color and the chromatic color that are included in the output image data is completed.

As above, according to the MFP 100 of this embodiment, a color index representing the category to which the achromatic color and at least one chromatic color that are included in the output image data is set, the color tone of the achromatic color belonging to the category that is indicated by the set color index is adjusted in accordance with the hue of the chromatic color belonging to the category that is indicated by the set color index; and image data, including at least one chromatic color belonging to the category that is indicated by the set index and the achromatic color of which the color tone is adjusted, is generated. Accordingly, in printing the image data including an achromatic color and at least one chromatic color, a decrease in the color contrast between the achromatic color and the chromatic color can be prevented; and therefore the representational power in colors that can be applied to a printed material in which the number of colors is limited or the like can be improved.

Modified Example 1

This modified example is an example in which the role of transforming the color space is transferred from the color converting unit to a three-dimensional lookup table (SD-LUT), and the role of the color converting unit is clarified to be generation of output image data in which the chromatic color and the achromatic color included in the input image data are substituted with other colors. The description of the same portion as that of the first embodiment is omitted here.

Figure 18:
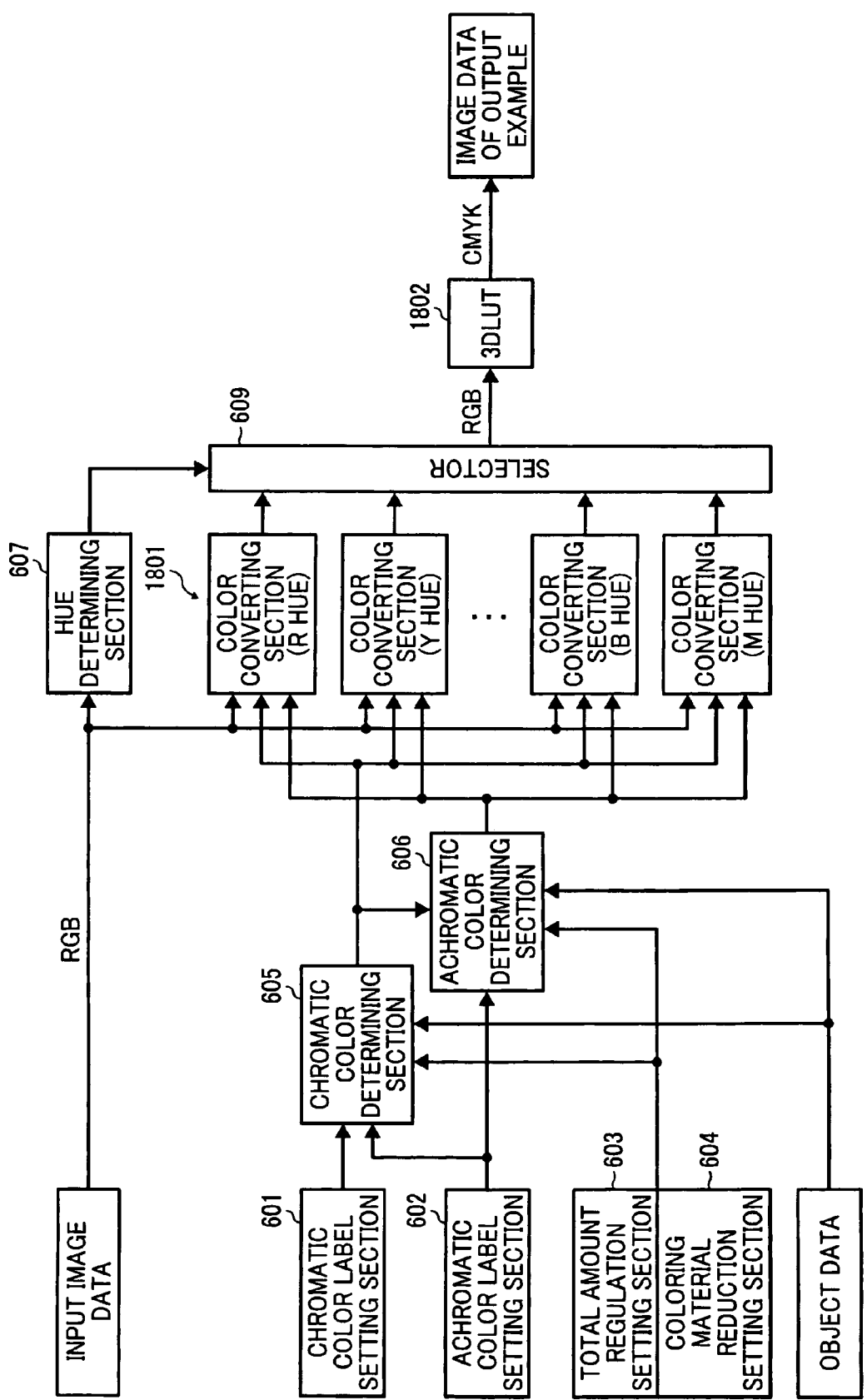
FIG. 18 is a block diagram showing a detailed structure of a color converting unit.

FIG. 18 is a block diagram showing a detailed structure of a color converting unit. A color converting unit 1801, similarly to the first embodiment, defines colors included in the input image data and the output image data as vectors for each hue of the input image data. However, the vector of the color included in the input image data and the vector of the color included in the output image data do not relate to an output destination (for example, printing or transferring) of the output image data; but are values that are represented in the same color space (for example, the RGB color space), which are different from the first embodiment. Accordingly, the color converting unit 1801 performs only a process in which the vectors of the chromatic color and the achromatic color included in the input image data are substituted with defined values of the chromatic color (or defined values of the chromatic color of which the color tone is adjusted by the chromatic color determining section 605) belonging to the category that is indicated by the color index set by the chromatic color label setting section 601 and defined values of the achromatic color of which the color tone is adjusted by the achromatic color determining section 606 through a masking operation, but does not perform transformation of the color space.

Then, the 3DLUT (1802) transforms the color space of the output image data. More specifically, the 3DLUT (1802) transforms the color space of the output image data into a CMYK color space in a printing process, and transforms the color space of the output image data into an RGB color space in a transferring process.

Modified Example 2

This modified example is an example in which the color tone of the achromatic color included in the output image data is adjusted in accordance with the degree of whiteness of a sheet. The description of the same portion as that of the first embodiment is omitted here.

Figure 20A:
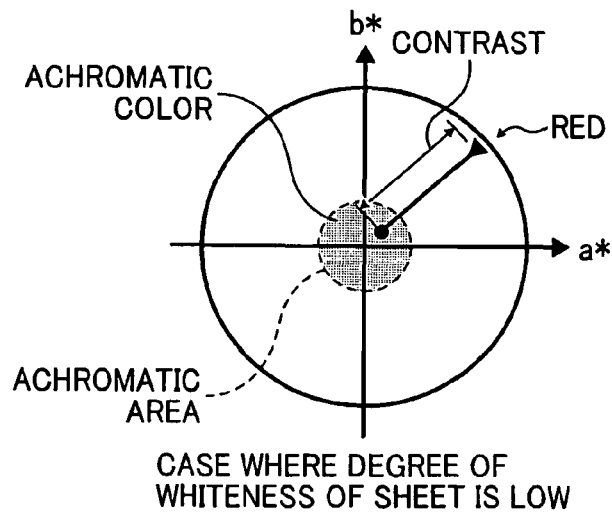
FIGS. 20A to 20C are chromaticity diagrams of output image data in which the color contrast is enhanced depending on the degree of whiteness of a sheet.
Figure 20B:
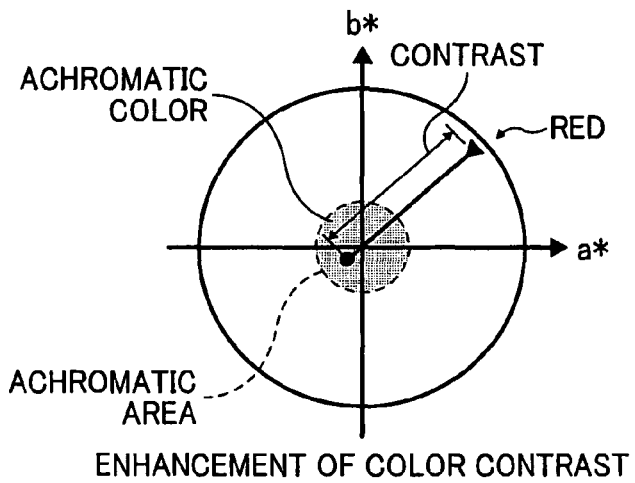
Figure 20C:
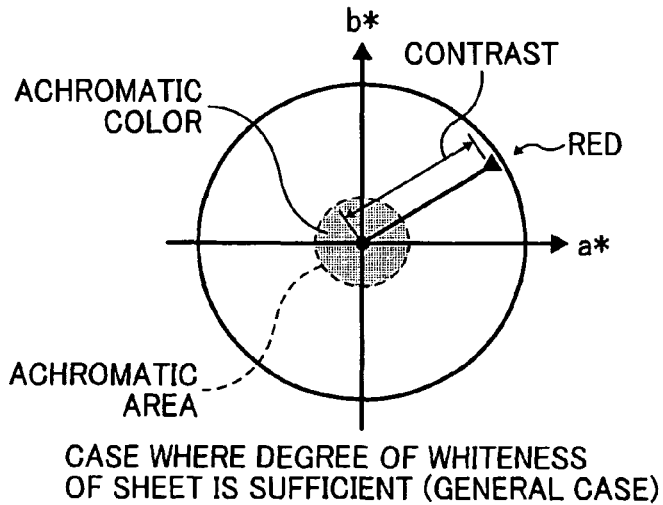

FIG. 19 is a schematic diagram illustrating an example of enhancement in the color contrast according to the degree of whiteness of a sheet. FIGS. 20A to 20C are chromaticity diagrams of the output image data of which the color contrast is enhanced in accordance with the degree of whiteness of a sheet. In a two-color printing process or the like, in the case in which the degree of whiteness of a sheet is low, and the color tone of "black" included in the output image data is deviated in the direction of "red" (shown in FIG. 19), compared to a difference in the chromaticity between "black" and "red" included in the output image data in the case in which the degree of whiteness of a sheet is sufficient (FIG. 20C); the difference in the chromaticity between "black" and "red" included in the output image data is decreased, and accordingly, the color contrast of the output image data decreases (shown in FIG. 20A).

Thus, in this modified example, the achromatic color determining section 606 adjusts the color tone of the achromatic color included in the output image data in accordance with the degree of whiteness of a sheet. More specifically, in the case in which the degree of whiteness of a sheet is low (for example, the color of the sheet becomes yellow), the achromatic color determining section 606 increases the saturation of the achromatic color included in the output image data in the direction of the complementary color of the hue of the chromatic color belonging to the category set by the chromatic color label setting section 601. Accordingly, the color tone of "black" included in the output image data becomes a colder tone, and a difference (shown in FIG. 20B) in the chromaticity between the chromatic color and the achromatic color included in the output image data approaches a difference (shown in FIG. 20C) in the chromaticity between "black" and "red" included in the output image data in the case in which the degree of whiteness of a sheet is sufficient, and thereby the color contrast of the output image data is enhanced (shown in FIG. 19).

Second Embodiment

This embodiment is an example in which the adjusted is only the color tone of the achromatic color in an achromatic color area located near a chromatic color area out of the achromatic color area of the input image data. The description of the same portion as that of the first embodiment is omitted here.

Figure 21:
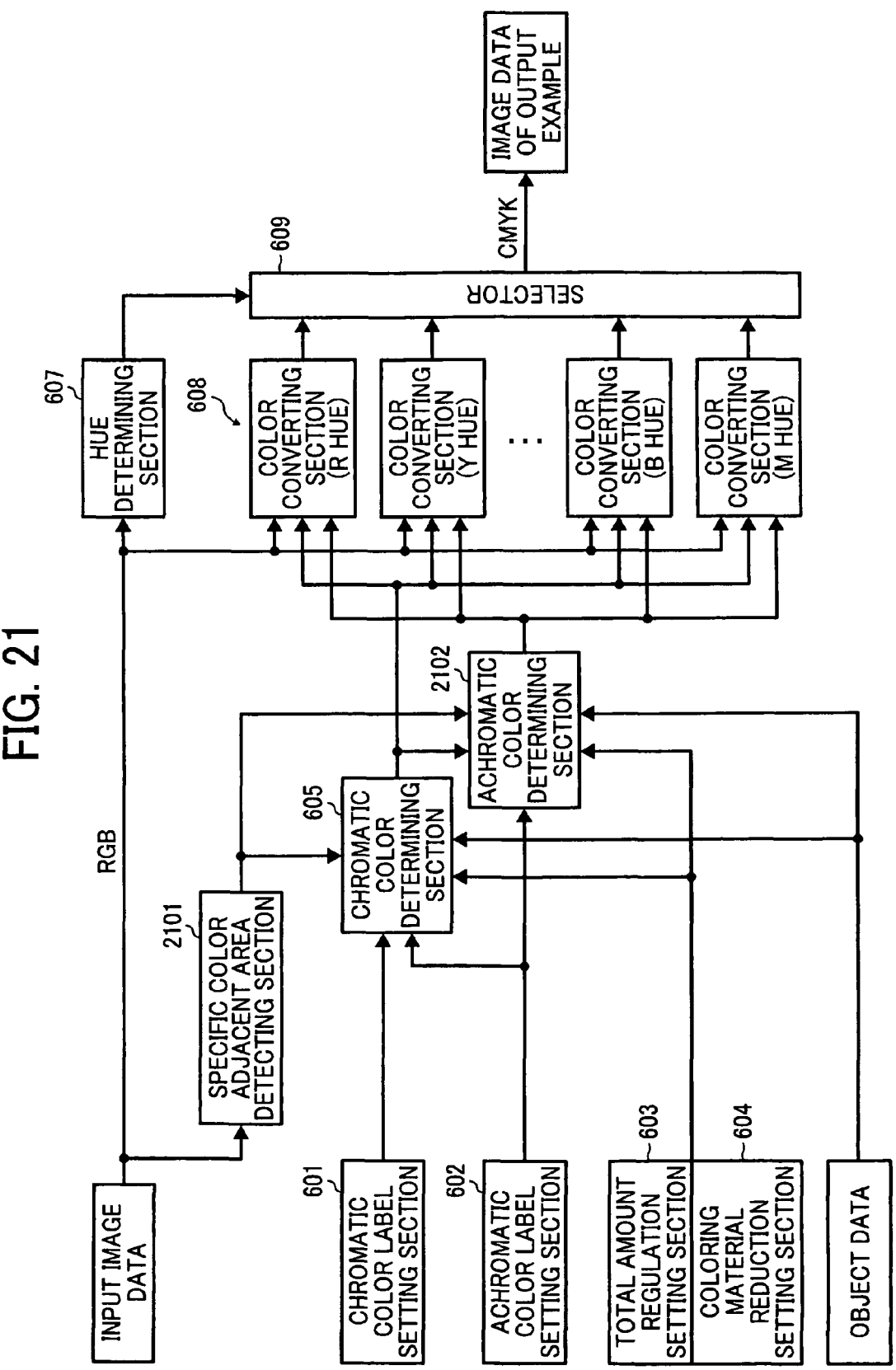
FIG. 21 is a block diagram showing a detailed structure of a color converting unit.
Figure 22:
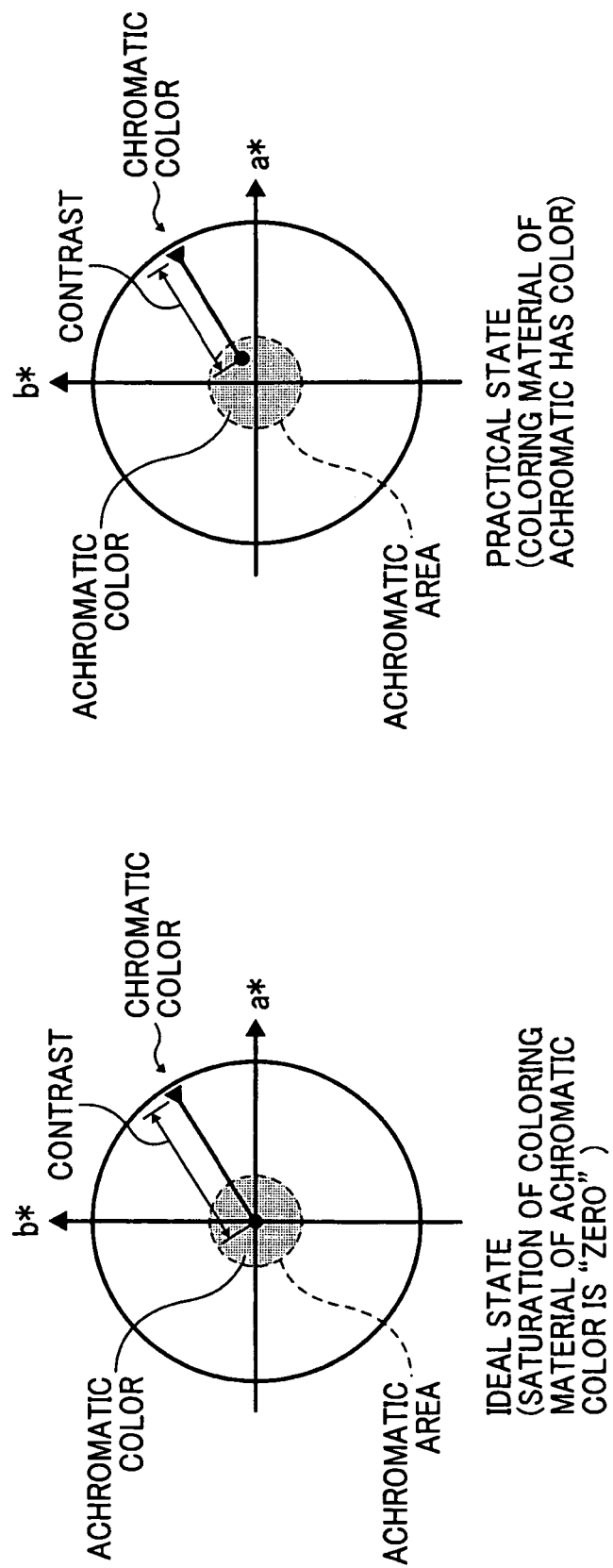
FIG. 22 is a diagram representing an example of a difference in color between the achromatic color and the chromatic color in the case in which an ideal black coloring material is used; and an example of a difference in chromaticity between the achromatic color and the chromatic color in the case in which a black coloring material that has been practically used is used.

FIG. 21 is a block diagram showing a detailed structure of a color converting unit. A specific color adjacent area detecting section 2101 detects a specific color adjacent area that is located adjacent to a chromatic color area out of the achromatic color area of the input image data.

An achromatic color determining section 2102 adjusts only the color tone of the achromatic color of the specific color adjacent area detected by the specific color adjacent area detecting section 2101. Accordingly, in a two-color printing process or the like, the adjustment of the color tone is performed only for an area located adjacent to the chromatic color, and therefore the effect of improving the representational power in colors that is acquired by adjustment of the color tone can be strong.

In addition, in this embodiment, the color converting unit 104b included in the second image data processing device 104 is realized by hardware. However, the color converting unit 104b may be realized by executing a program that is built in the ROM 114 in advance by using the CPU 106.

The program executed by the MFP 100 of this embodiment may be configured to be provided by being recorded on a computer-readable recording medium such as a CD-ROM, a flexible disk (FD), a CD-R, or a DVR (Digital Versatile Disk) as a file of an installable format or executable format.

Furthermore, the program executed by the MFP 100 of this embodiment may be configured to be provided by being stored on a computer connected to a network such as the Internet and downloaded via the network. In addition, the program executed by the MFP 100 of this embodiment may be configured to be provided or distributed via a network such as the Internet.

In the above-described embodiments, described have been examples in which an image processing apparatus according to an embodiment of the present invention is applied to an MFP having at least two functions out of a copy function, a printer function, a scanner function, and a facsimile function. However, an embodiment of the present invention can be applied to any image forming apparatus such as a copy machine, a scanner device, or a facsimile device.

According to an embodiment of the present invention, in printing image data including an achromatic color and at least one chromatic color, a decrease in color contrast between the achromatic color and the chromatic color can be prevented, and the representational power of a printed material can be improved in which use of colors is restricted in number.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:

a setting unit configured to set a color index representing a category to which an achromatic color and at least one chromatic color that are included in image data belong;

an adjustment unit configured to adjust a color tone of the achromatic color belonging to the category that is indicated by the set color index in accordance with a hue of the at least one chromatic color belonging to the category;

a generation unit configured to generate image data including the at least one chromatic color belonging to the category and the achromatic color of which the color tone is adjusted by the adjustment unit; and a total amount regulation setting unit configured to set a total amount regulating value used for regulating a total amount of quantitative values of colors in an output color space, wherein the adjustment unit is configured to adjust the color tone of the achromatic color belonging to the category such that a color difference, which differs between the at least one chromatic color belonging to the category and the achromatic color belonging to the category in an input color space that represents colors included in input image data as quantitative values, is conserved also in the output color space that represents colors included in output image data as quantitative values, the adjustment unit is configured to adjust the color tones of the at least one chromatic color and the achromatic color such that a total amount of quantitative values of the at least one chromatic color belonging to the category and a total amount of quantitative values of the achromatic color belonging to the category in the output color space do not exceed the total amount regulating value, and the generation unit is configured to generate image data including the at least one chromatic color and the achromatic color of which the color tones are adjusted by the adjustment unit.

2. The image processing apparatus according to claim 1, wherein the adjustment unit is configured to adjust the color tone of the achromatic color belonging to the category by increasing saturation in a direction of a complementary color of a hue of the at least one chromatic color belonging to the category.

3. The image processing apparatus according to claim 2, further comprising:

a detection unit configured to detect an achromatic color area adjacent to a chromatic color area within the image data, wherein the adjustment unit is configured to change adjustment of the color tone of the achromatic color belonging to the category between in the detected achromatic color area and in an achromatic color area that is not adjacent to the chromatic area.

4. The image processing apparatus according to claim 1, further comprising:

a coloring material reduction setting unit configured to set a save mode in which an amount of the coloring material used for output of the image data is decreased, wherein the adjustment unit, in the case in which the save mode is set, is configured to adjust the color tones of the at least one chromatic color and the achromatic color belonging to the category such that an amount of the coloring material used for output of the at least one chromatic color and the achromatic color is equal to or less than a predetermined amount, and wherein the generation unit is configured to generate image data that includes the at least one chromatic color and the achromatic color of which the color tones are adjusted by the adjustment unit.

5. The image processing apparatus according to claim 1, wherein the adjustment unit, in the case in which a plurality of the at least one chromatic colors belong to the category, is configured to adjust the color tone of the achromatic color belonging to the category by increasing saturation based on an average of saturation in directions of complementary colors of the hues of the plurality of the at least one chromatic colors.

6. An image processing method that is performed in an image processing apparatus that includes a control unit, the image processing method comprising in the control unit:

setting a color index representing a category to which an achromatic color and at least one chromatic color that are included in image data belong by using a setting unit;

adjusting a color tone of the achromatic color belonging to the category that is set at the setting in accordance with a hue of the at least one chromatic color belonging to the category by using an adjustment unit;

generating image data including the at least one chromatic color belonging to the category and the achromatic color of which the color tone is adjusted by the adjustment unit by using a generation unit; and setting a total amount regulating value used for regulating a total amount of quantitative values of colors in an output color space, wherein the adjusting adjusts the color tone of the achromatic color belonging to the category such that a color difference, which differs between the at least one chromatic color belonging to the category and the achromatic color belonging to the category in an input color space that represents colors included in input image data as quantitative values, is conserved also in the output color space that represents colors included in output image data as quantitative values, the adjusting adjusts the color tones of the at least one chromatic color and the achromatic color such that a total amount of quantitative values of the at least one chromatic color belonging to the category and a total amount of quantitative values of the achromatic color belonging to the category in the output color space do not exceed the total amount regulating value, and the generating generate image data including the at least one chromatic color and the achromatic color of which the color tones are adjusted.

7. A computer program product comprising a non-transitory computer-usable medium having computer-readable program codes embodied in the medium for an image processing method that is performed in an image processing apparatus that includes a control unit, the program codes when executed causing a computer to execute:

setting a color index representing a category to which an achromatic color and at least one chromatic color that are included in image data belong by using a setting unit;

adjusting a color tone of the achromatic color belonging to the category that is set at the setting in accordance with a hue of the at least one chromatic color belonging to the category by using an adjustment unit;

generating image data including the at least one chromatic color belonging to the category and the achromatic color of which the color tone is adjusted by the adjustment unit by using a generation unit; and setting a total amount regulating value used for regulating a total amount of quantitative values of colors in an output color space, wherein
- the adjusting adjusts the color tone of the achromatic color belonging to the category such that a color difference, which differs between the at least one chromatic color belonging to the category and the achromatic color belonging to the category in an input color space that represents colors included in input image data as quantitative values, is conserved also in the output color space that represents colors included in output image data as quantitative values,
- the adjusting adjusts the color tones of the at least one chromatic color and the achromatic color such that a total amount of quantitative values of the at least one chromatic color belonging to the category and a total amount of quantitative values of the achromatic color belonging to the category in the output color space do not exceed the total amount regulating value, and
- the generating generate image data including the at least one chromatic color and the achromatic color of which the color tones are adjusted.

* * * * *